(12) United States Patent
Inoue

(10) Patent No.: US 9,021,918 B2
(45) Date of Patent: May 5, 2015

(54) BICYCLE PEDAL

(75) Inventor: Akira Inoue, Osaka (JP)

(73) Assignee: Shimano Inc., Osaka (JP)

( * ) Notice: Subject to any disclaimer, the term of this patent is extended or adjusted under 35 U.S.C. 154(b) by 580 days.

(21) Appl. No.: 12/948,852

(22) Filed: Nov. 18, 2010

(65) Prior Publication Data

US 2012/0125147 A1 May 24, 2012

(51) Int. Cl.
*B62M 3/00* (2006.01)
*B62M 3/08* (2006.01)

(52) U.S. Cl.
CPC ............... *B62M 3/086* (2013.01); *Y10T 74/217* (2015.01)

(58) Field of Classification Search
CPC ..... B62M 3/08; B62M 3/086; Y10T 74/2133; Y10T 74/217; Y10T 74/2172; Y10T 74/2164; Y10T 74/2168; Y10T 74/2136; Y10T 74/2137; Y10T 74/214
USPC .............. 74/594.6, 594.4, 594.1, 575, 577 R, 74/577 S, 577 M, 576; 36/131; 280/11.3, 280/632, 613; 192/69.81, 46
See application file for complete search history.

(56) References Cited

U.S. PATENT DOCUMENTS

| | | | |
|---|---|---|---|
| 5,014,571 A * | 5/1991 | Dapezi ......................... | 74/594.6 |
| 5,769,197 A * | 6/1998 | Kest et al. ...................... | 192/46 |
| 6,164,158 A | 12/2000 | Landru et al. | |
| 6,446,529 B1 | 9/2002 | Tanaka | |
| 6,845,688 B2 | 1/2005 | Muraoka | |
| 7,104,159 B2 * | 9/2006 | Plassiard et al. .............. | 74/594.6 |
| 7,954,400 B2 * | 6/2011 | Lee ................................ | 74/594.4 |
| 2003/0029271 A1 * | 2/2003 | Shuman ........................ | 74/594.6 |
| 2006/0070489 A1 * | 4/2006 | Chen ............................. | 74/594.6 |
| 2008/0229875 A1 * | 9/2008 | Ray .............................. | 74/594.6 |
| 2010/0005924 A1 | 1/2010 | Servignat et al. | |

FOREIGN PATENT DOCUMENTS

| | | |
|---|---|---|
| EP | 0 953 502 A1 | 11/1999 |
| FR | 2385582 A1 | 10/1978 |
| FR | 2485226 A1 | 12/1981 |
| FR | 2 862 041 A1 | 5/2005 |
| WO | WO-2008/129145 A1 | 10/2008 |

OTHER PUBLICATIONS

Machine Translation of FR 2,862,041, May 14, 2013.*

* cited by examiner

*Primary Examiner* — Marcus Charles
*Assistant Examiner* — Yamilka Pinero Medina
(74) *Attorney, Agent, or Firm* — Global IP Counselors

(57) ABSTRACT

A bicycle pedal is provided with a pedal spindle, a pedal body, a cleat engagement member and an actuation member. The pedal body is rotatably mounted on the pedal spindle. The cleat engagement member is movably mounted relative to the pedal body between a release position and an engagement position. The cleat engagement member is biased towards the release position. The actuation member is mechanically connected to the cleat engagement member. The actuation member is movably mounted relative to the pedal body from a first position to a second position such that the actuation member moves the cleat engagement member from the release position to the engagement position.

30 Claims, 29 Drawing Sheets

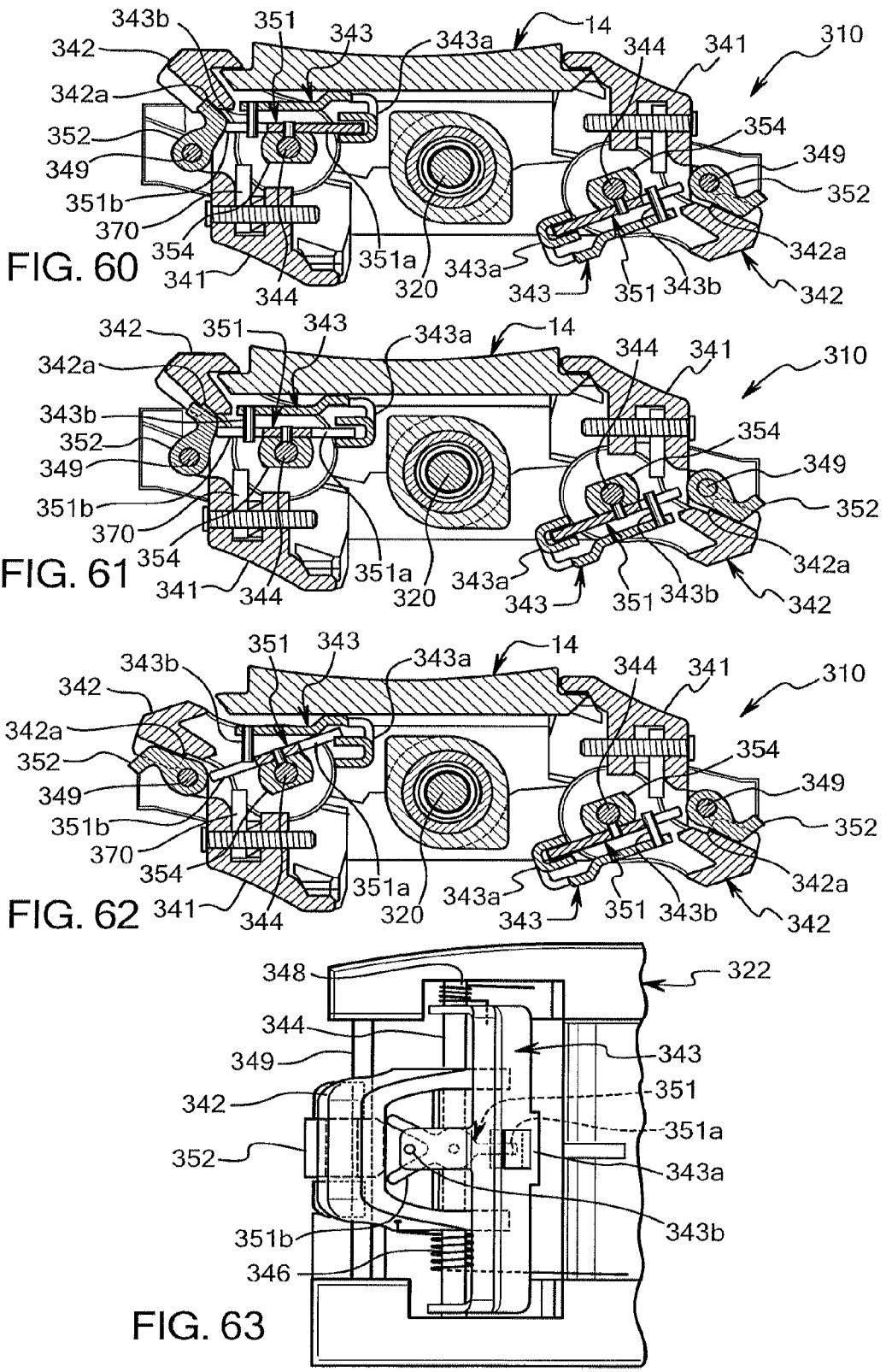

BICYCLE PEDAL

BACKGROUND

1. Field of the Invention

This invention generally relates to a bicycle pedal. More specifically, the present invention relates to a step-in or clipless type of bicycle pedal that engages a cleat in a releasable manner.

2. Background Information

Pedals are typically an essential bicycle component of most bicycles in that they transfer cycling power to the bicycle's drive train. Different styles of bicycles utilize different bicycle pedal styles that are designed for a specific purpose such as for pleasure, off road biking, road racing, etc. In recent years, step-in or clipless pedals have been gaining more popularity. The step-in or clipless pedal releasably engages a cleat that is secured to the sole of a rider's shoe. In other words, cleats are attached to the soles of specially-designed cycling shoes. The cleats lock the rider's feet into the pedals.

The step-in pedal typically has a pedal spindle that can be mounted on the crank of a bicycle, a pedal body that is rotatably supported on this pedal spindle, and at least one cleat engagement mechanism that clamps onto the cleat. In the case of off road bicycle pedals, typically both sides of the pedal body are provided with a cleat engagement mechanism for engaging a cleat in a releasable manner. On the other hand, in the case of road racing pedals, typically only one side of the pedal body is provided with a cleat engagement mechanism for engaging a cleat in a releasable manner. In either case, in using step-in or clipless types of bicycle pedals, the rider steps onto one side of the pedal body and the cleat engagement mechanism automatically grips on to the cleat that is secured to the bottom sole of the rider's shoe.

More specifically, in most cases, when attaching the rider's shoe to the step-in pedal via the cleat, the rider moves the shoe obliquely downwardly and forwardly relative to the pedal body such that the front end of the cleat engages a front hook or cleat engagement member of the pedal body. Once the front end of the cleat is engaged with the front hook of the pedal body, the rider places the rear end of the cleat in contact with a guide portion of the rear hook or cleat engagement member of the pedal body. In this position, the rider presses the shoe downwardly against the step-in pedal to cause the rear hook or cleat engagement member to initially pivot rearward against the force of a spring to move the rear hook or cleat engagement member to a cleat releasing position. The rear end of the cleat then enters a position opposite a back face of the rear hook or cleat engagement member. Then, the rear hook or cleat engagement member returns under the force of a biasing member or spring so that the rear hook or cleat engagement member engages the rear end of the cleat. This engagement fixes the rider's shoe to the step-in pedal via the cleat.

When releasing the shoe from most types of step-in pedals, the rider will typically turn the shoe about an axis perpendicular or approximately perpendicular to the tread of the rider's shoe, using the front end of the cleat as a pivoting point. As a result of this pivoting action, the rear cleat engagement member is pivoted rearward against the force of the spring to a cleat releasing position to release the shoe. Two examples of step-in pedals that operate in the above mentioned manner are disclosed in U.S. Pat. No. 6,845,688 and U.S. Pat. No. 6,446,529.

Of course, other types of step-in pedals have been proposed that operate in a slightly different manner. For example, U.S. Patent Publication No. 2010/0005924 discloses a step-in type of bicycle pedal in which the rear cleat engagement member is initially in a release position during a step-in operation. Also U.S. Pat. No. 6,164,158 discloses a step-in type of bicycle pedal in which a hydraulic circuit is used to move both front and rear cleat engagement members from initial released positions to engagement positions during a step-in operation.

SUMMARY

One object of the present invention is to provide a step-in type of bicycle pedal that is easy for a rider to use.

The foregoing object can basically be attained by providing a bicycle pedal that comprises a pedal spindle, a pedal body, a cleat engagement member and an actuation member. The pedal body is rotatably mounted on the pedal spindle. The cleat engagement member is movably mounted relative to the pedal body between a release position and an engagement position. The cleat engagement member is biased towards the release position. The actuation member is mechanically connected to the cleat engagement member. The actuation member is movably mounted relative to the pedal body from a first position to a second position such that the actuation member moves the cleat engagement member from the release position to the engagement position.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 60 is a longitudinal cross sectional view of the bicycle pedal illustrated in FIGS. 55 to 59, showing the arrangement of the positioning structure while the cleat engagement member is in the engagement position;

FIG. 61 is a longitudinal cross sectional view of the bicycle pedal illustrated in FIGS. 55 to 60, showing the arrangement of the positioning structure after the cleat engagement member is moved laterally while in the engagement position and the actuation member is held down by the cleat;

FIG. 62 is a longitudinal cross sectional view of the bicycle pedal illustrated in FIGS. 55 to 61, showing the arrangement of the positioning structure after the cleat engagement member is moved laterally and the actuation member is released from the cleat;

FIG. 63 is a partial top plan view of a portion of the bicycle pedal illustrated in FIGS. 55 to 62, showing the arrangement of the positioning structure while the cleat engagement member is in the release position;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
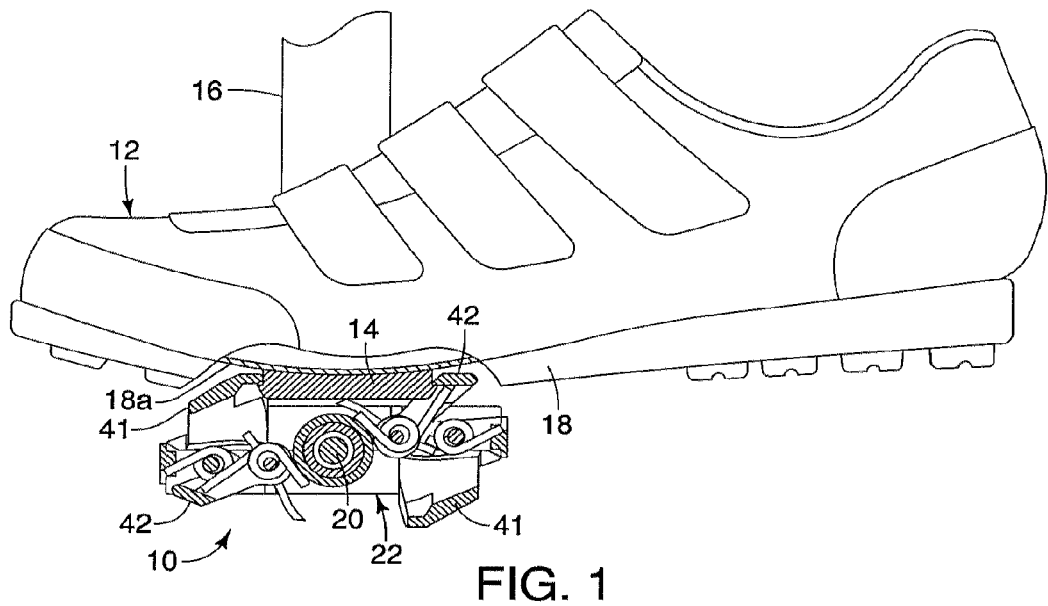
FIG. 1 is an outside elevational view of a bicycle shoe attached to a left bicycle pedal (shown longitudinal cross section) via a cleat of the bicycle shoe in accordance with a first illustrated embodiment.
Figure 2:
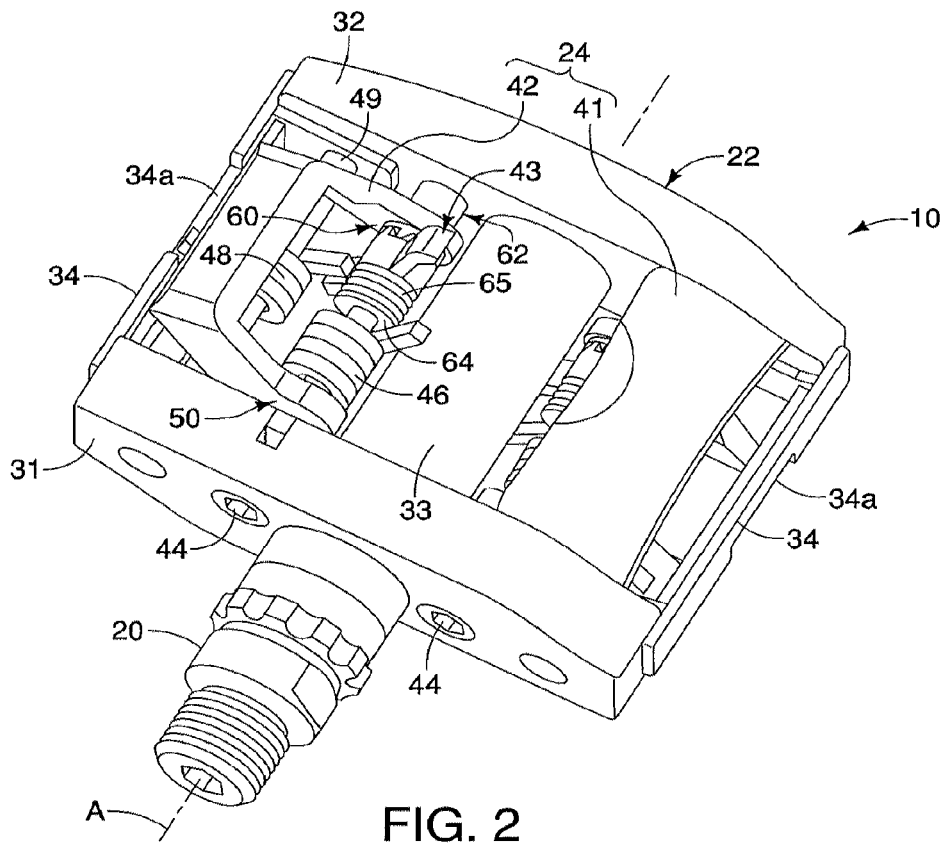
FIG. 2 is a top perspective view of the bicycle pedal illustrated in FIG. 1, showing the cleat engagement member in the release position.
Figure 3:
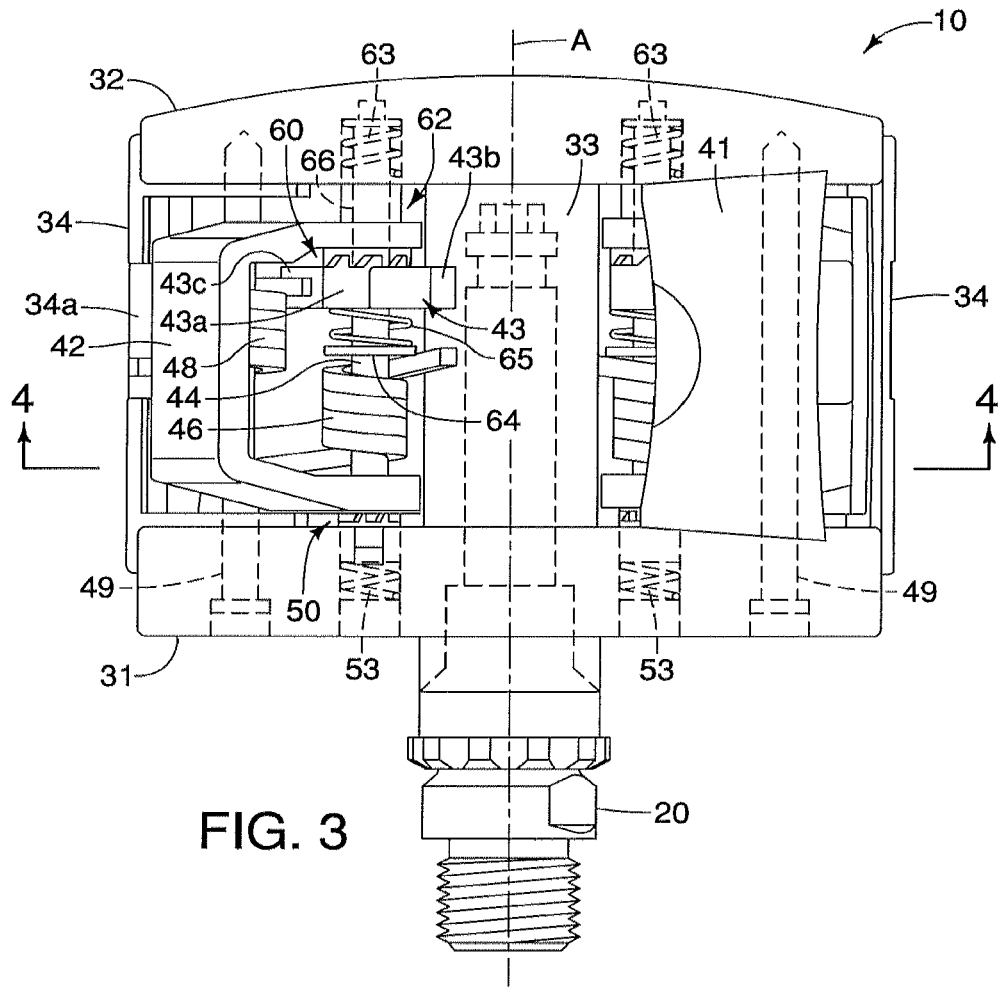
FIG. 3 is a top plan view of the bicycle pedal illustrated in FIGS. 1 and 2, showing the cleat engagement member in the release position.

Referring initially to FIGS. 1 to 3, a bicycle pedal 10 is illustrated in accordance with a first illustrated embodiment. The bicycle pedal 10 is a clipless or step-in pedal that can be used with a bicycle shoe 12 having a cleat 14 coupled thereto. As seen in FIG. 1, the bicycle pedal 10 is fixedly coupled to a bicycle crank arm 16 of a bicycle in a conventional manner. The cleat 14 is fixedly coupled to a bottom surface of a sole 18 of the shoe 12 by a conventional fastening arrangement (not shown). The fastening arrangement typically includes a cleat nut plate, a cleat fixing plate and a pair of fixing bolts. However, the cleat fastening arrangement for the cleat 14 can be any type of fastening arrangement, and thus, the cleat fastening arrangement will not be discussed in detail herein. As seen in FIG. 1, the cleat 14 is at least partially disposed in a recess 18a of the sole 18 of the shoe 12.

Figure 4:
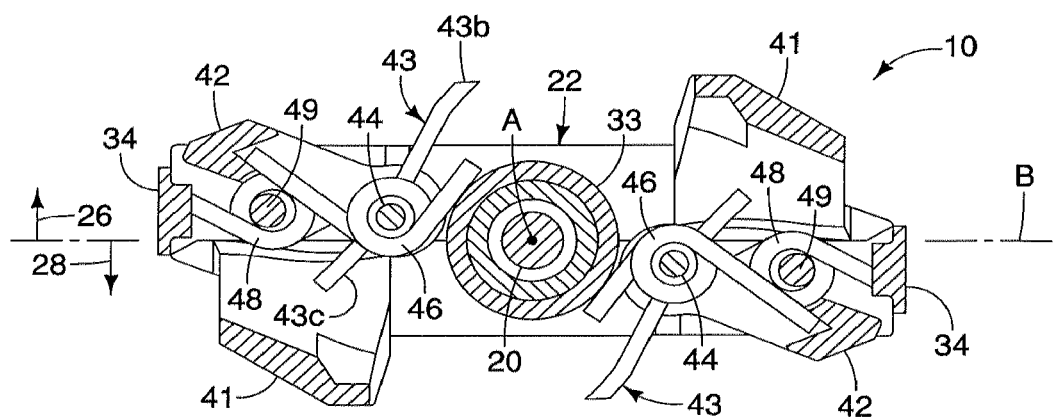
FIG. 4 is an enlarged longitudinal cross sectional view of the bicycle pedal illustrated in FIGS. 1 to 3, as seen along section line 4-4 of FIG. 3.
Figure 5:
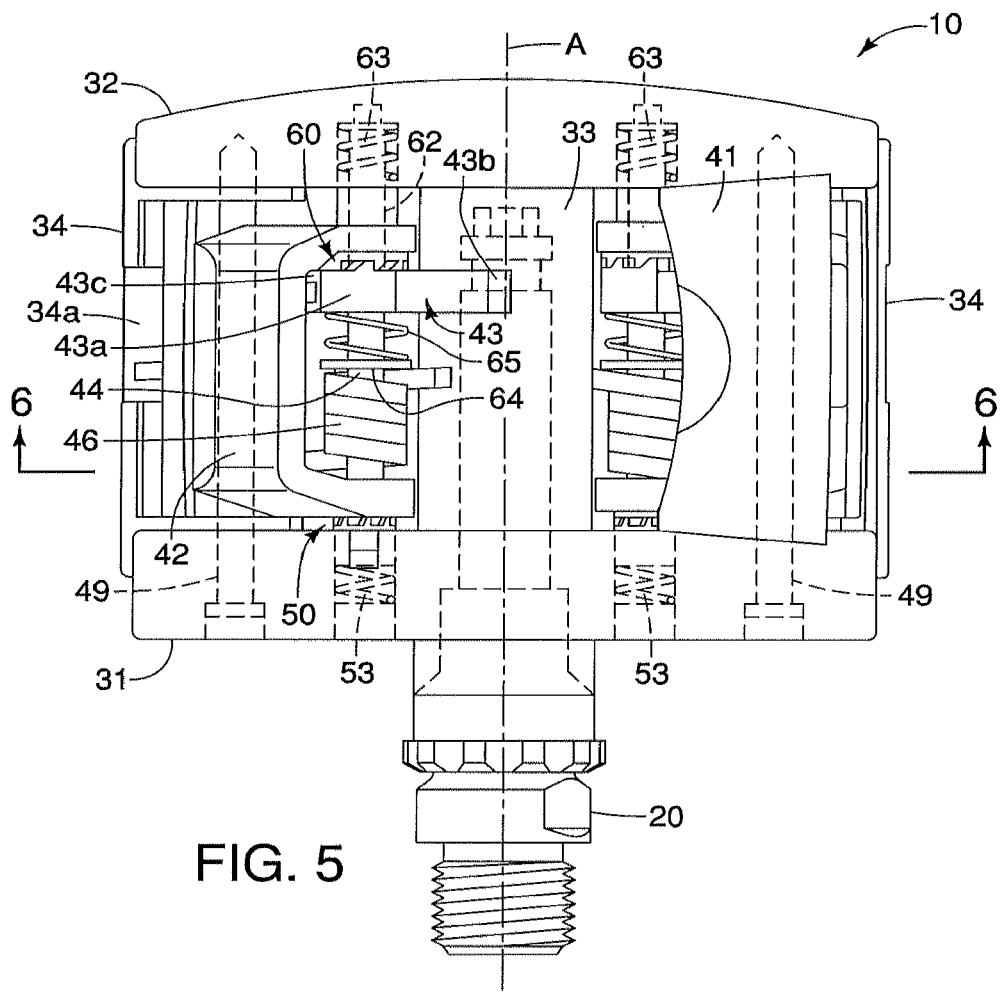
FIG. 5 is a top plan view of the bicycle pedal illustrated in FIGS. 1 to 4, showing the cleat engagement member in the engagement position.
Figure 6:
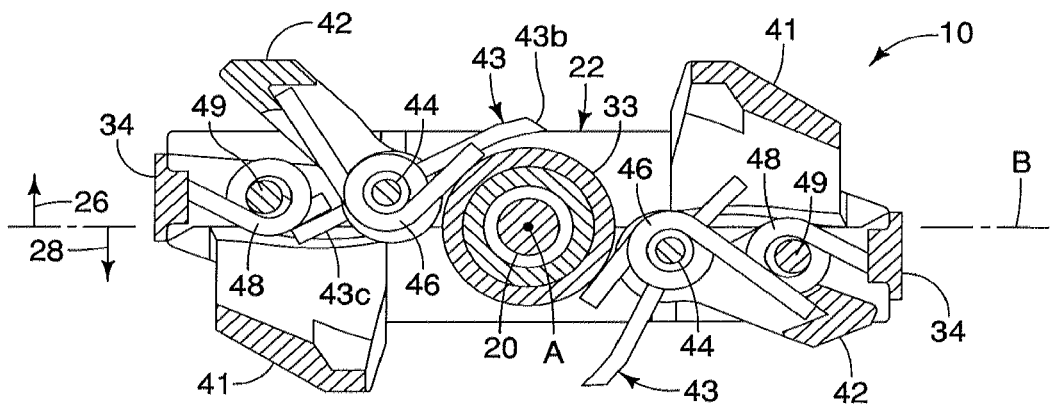
FIG. 6 is an enlarged longitudinal cross sectional view of the bicycle pedal illustrated in FIGS. 1 to 5, as seen along section line 6-6 of FIG. 5.

The bicycle pedal 10 is configured and arranged such that the cleat 14 is engaged with the pedal 10 with a relatively low engagement force and such that the cleat 14 is disengaged from the pedal 10 with a relatively low disengagement force. The bicycle pedal 10 mainly includes a pedal spindle or axle 20 and a pedal body 22. The pedal spindle 20 has a center spindle axis A, with the pedal body 22 rotating on the pedal spindle 20 about the center spindle axis A. In this embodiment, the bicycle pedal 10 includes a pair of cleat retaining structures 24 for selectively securing the cleat 14 to the pedal body 22. Depending on the orientation of the pedal body 22, one of the ends of the pedal body 22 is considered a front or first end, while the other end is considered a second or rear end. As seen in FIGS. 4 and 6, the pedal body 22 has a center plane B extending through the center spindle axis A. The center plane B divides the pedal body 22 into first and second shoe supporting sides 26 and 28. The center plane B bisects the pedal body 22 with a cleat receiving area formed on each side of the first and second shoe supporting sides 26 and 28. The first and second shoe supporting sides 26 and 28 can also be considered first and second cleat engagement sides. The center plane B constitutes a reference plane lying between the first and second shoe supporting sides 26 and 28 and passing through the center spindle axis A.

In the FIGS. 1 to 20, the bicycle pedal 10 is a left side bicycle pedal. A right side bicycle pedal (not shown) is a mirror image of the left side bicycle pedal 10, except that the pedal spindle of the right-side (usually the drive-side) has right-hand thread, while the pedal spindle 20 of the left-side (usually the non-drive-side) has a left-hand (reverse) thread to help prevent the pedals from becoming loose. Thus, for the sake of simplicity, only the bicycle pedal 10, which is a left side bicycle pedal will be illustrated and described herein. Of course, the description of the bicycle pedal 10 applies to a right-side bicycle pedal.

The pedal spindle 20 has a first end with a thread that is adapted to be threaded into a hole of the crank arm 16. The pedal spindle 20 has a second end that rotatably supports the pedal body 22 such that the pedal body 22 rotates relative to the crank arm 16 about the center spindle axis A. The pedal spindle 20 is a rigid member that is made of a suitable lightweight material, such as aluminum alloy. The pedal spindle 20 is a relatively conventional part of the bicycle pedal 10, and thus, the pedal spindle 20 will not be discussed in more detail.

Referring to FIGS. 2 to 6, the pedal body 22 is a rigid member that is made of a suitable lightweight material, such as aluminum alloy, a synthetic resin, or a fiber reinforced plastic. The pedal body 22 is designed to support a rider's foot by a releasable connection between one of the cleat retaining structures 24 and the cleat 14. As seen in FIG. 3, in the first illustrated embodiment, the pedal body 22 basically includes a first side member 31, a second side member 32 and a tubular spindle supporting member 33. As illustrated, the members 31 to 33 of the pedal body 22 are integrally formed as a one-piece, unitary member. Of course, other configurations of the pedal body 22 are possible. The pedal body 22 further includes a pair of cage plates 34 that are fixedly attached to the free ends of the first and second side members 31 and 32 of the pedal body 22.

Referring to FIGS. 4 and 6, the cleat retaining structures 24 have identical configurations so that the rider can engage the cleat 14 to either of the first or second shoe supporting sides 26 and 28 in the same manner. Since the cleat retaining structures 24 are identical, the same reference numeral will be used to describe both of the cleat retaining structures 24. In the first illustrated embodiment, the cleat retaining structures 24 provide approximately the same fixing force as a conventional step-in pedal in which a rear cleat engagement member is biased towards a cleat engagement position, and in which a twisting motion is used to release the cleat from the pedal body. Also in the first illustrated embodiment, the cleat retaining structures 24 are configured to provide a lower step-in force and a lower step-out force than such conventional step-in pedal in which a rear cleat engagement member is biased towards a cleat engagement position.

In the first illustrated embodiment, the cleat retaining structures 24 are configured to provide for a rider to secure the cleat 14 to the pedal body 22 as compared to a conventional step-in pedal in which a rear cleat engagement member is biased towards a cleat engagement position. Also in the first illustrated embodiment, the cleat retaining structures 24 are configured to provide lower a step-out force for a rider to release the cleat 14 from the pedal body 22 as compared to a conventional step-in pedal in which a rear cleat engagement member is biased towards a cleat engagement position and a twisting motion is used to release the cleat from the pedal body.

In the first illustrated embodiment, each of the cleat retaining structures 24 has a first or front cleat engagement member 41 and a second or rear cleat engagement member 42. The front and rear cleat engagement members 41 and 42 have an overall U-shape. The cleat engagement members 41 are fixed to the pedal body 22, while the cleat engagement members 42 are movably coupled to the pedal body 22.

In this embodiment, one of the cleat engagement member 42 constituting a first cleat engagement member with a first cleat contact surface that is located on the first cleat engagement side (the first shoe supporting side 26), while the other one of the cleat engagement members 42 constitutes a second cleat engagement member with a second cleat contact surface that is located on the second cleat engagement side (the second shoe supporting side 28). The first cleat contact surface faces the pedal body 22 to at least partially define a first cleat retaining area located on a first cleat engagement side of the reference plane B that passes through the center spindle axis A of the pedal spindle 20. The second cleat contact surface faces the pedal body 22 to at least partially define a second cleat retaining area located on a second cleat engagement side of the reference plane B.

Each of the cleat engagement members 42 has an associated actuation member 43 that is movably coupled to the pedal body 22 as explained below. Each of the actuation members 43 is configured and arranged for moving a respective one of the cleat engagement members 42 from a release position (FIG. 4) and an engagement position (top half of FIG. 6). Of course, the pedal body 22 can include only one of the cleat retaining structures 24, if needed and/or desired as is often the case of a road style bicycle pedal.

In the first illustrated embodiment, the cleat engagement members 41 extend between the first and second side members 31 and 32 of the pedal body 22. While the cleat engagement members 41 and the first and second side members 31 and 32 are integrally formed as a one-piece, unitary member, the cleat engagement members 41 can be separate members that are fixedly attached to the first and second side members 31 and 32. Alternatively, as discussed below, the cleat engagement members 41 can be movably mounted to the pedal body 22 and arranged to operate in the same or substantially the same manner as the cleat engagement members 42.

The cleat engagement members 42 are each a one-piece, unitary member that is movably mounted relative to the pedal body 22 between a release position and an engagement position. The cleat engagement members 42 are biased towards their release positions. In the first illustrated embodiment, the cleat engagement members 42 are pivotally mounted to the pedal body 22 by a pair of pivot pins 44 for movement between the release position and the engagement position. The pivot pins 44 are fixedly mounted between the first and second side members 31 and 32 of the pedal body 22. The cleat engagement members 42 are also movably mounted relative to the pedal body 22 in an axial direction along the pivot pins 44, respectively.

Each of the cleat engagement members 42 is biased towards their release positions by a return spring 46. The return springs 46 are operatively arranged between the pedal body 22 and a respective one of the cleat engagement members 42. Each of the return springs 46 constitutes a first biasing member that biases a respective one of the cleat engagement members 42 towards its release positions. In the first illustrated embodiment, the return springs 46 are torsion springs. The return springs 46 each have a coiled portion disposed on a respective one of the pivot pins 44. Also each of the return springs 46 has one of its free ends engaged in a recess 34a of a respective one of the cleat engagement members 42, and the other of its free ends contacting a respective one of the tubular spindle supporting member 33 of the pedal body 22.

With the arrangement of the first illustrated embodiment of FIGS. 1 to 20, the actuation members 43 are movably supported relative to the pedal body 22. In the first illustrated embodiment, the actuation members 43 are step-in actuation members that are independently operated by a rider stepping on a respective one of the actuation members 43 to move the corresponding one of the cleat engagement members 42 from the release position and the engagement position. In the first illustrated embodiment, the actuation members 43 are each rotatably mounted on one the pivot pins 44 to rotate relative to the pedal body 22.

Figure 7:
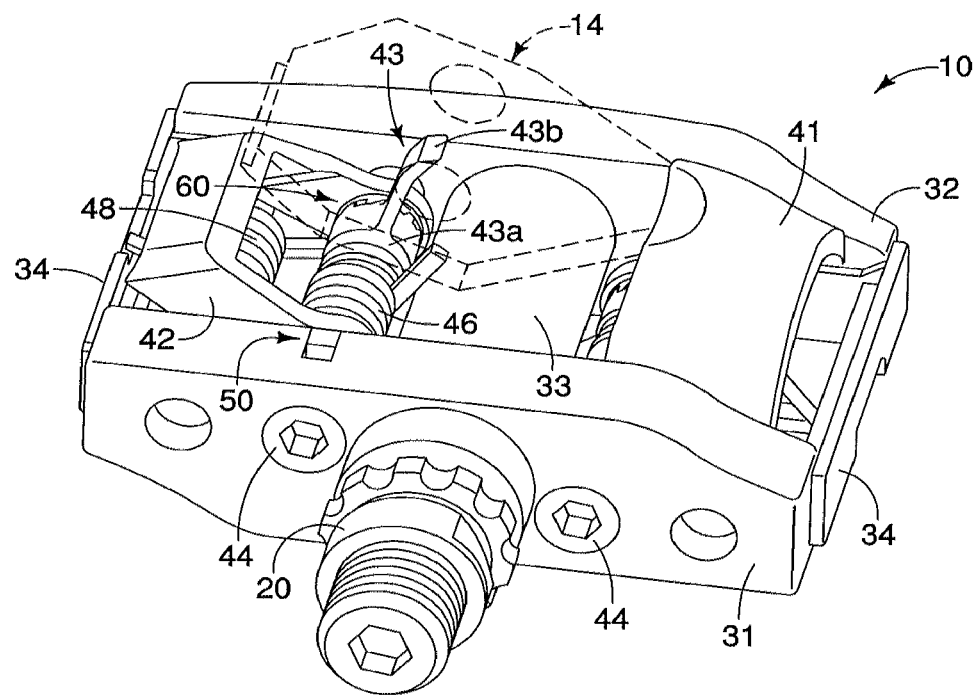
FIG. 7 is a perspective view of the bicycle pedal illustrated in FIGS. 1 to 6, showing a cleat being engaged with the bicycle pedal.
Figure 8:
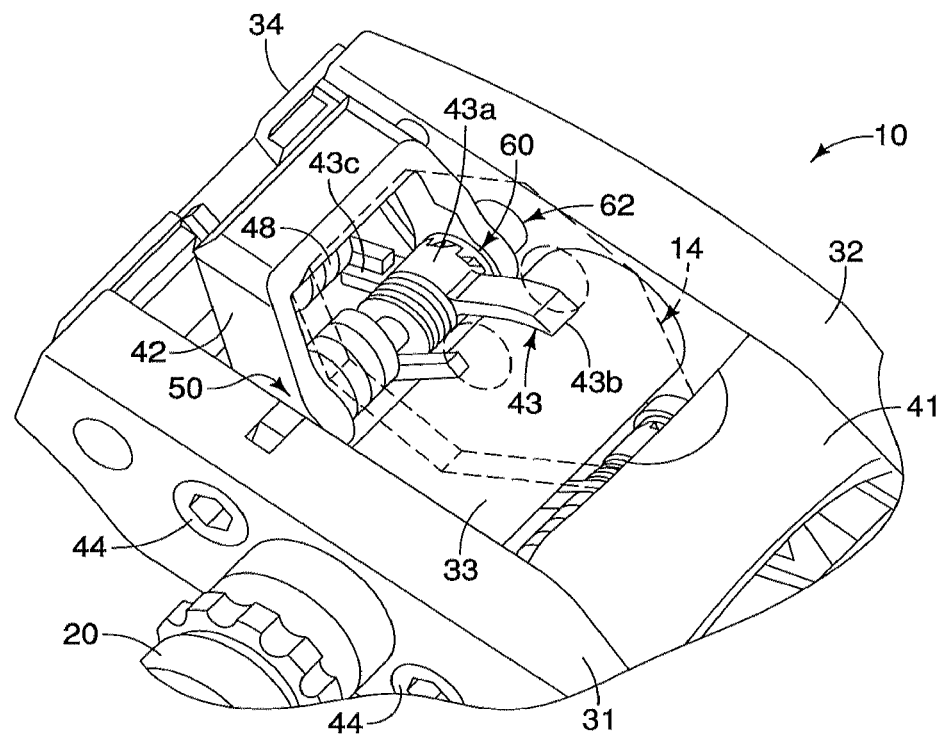
FIG. 8 is a perspective view of the bicycle pedal illustrated in FIGS. 1 to 7, showing the cleat engaged with the cleat engagement member.
Figure 9:
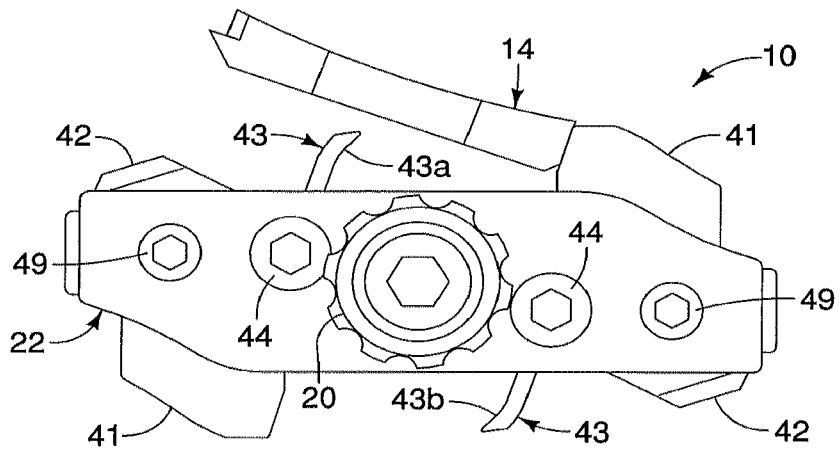
FIG. 9 is an inside elevational view of the bicycle pedal illustrated in FIGS. 1 to 8, showing a front end of the cleat engaged with the bicycle pedal.
Figure 10:
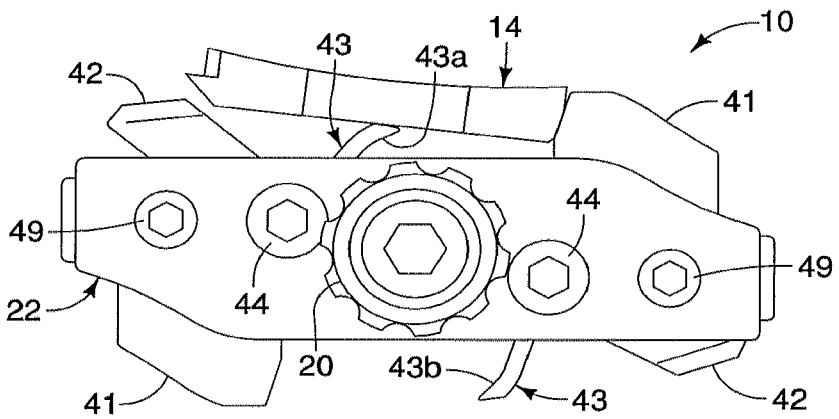
FIG. 10 is an inside elevational view, similar to FIG. 10, of the bicycle pedal illustrated in FIGS. 1 to 9, but showing the bottom surface of the cleat engaged with the actuation member of the bicycle pedal and the cleat engagement member being moved towards the engagement position.

As best seen in FIGS. 7 and 8, in the first illustrated embodiment, each of the actuation members 43 has a mounting portion 43a, a cleat contact portion 43b and a spring contact portion 43c. The actuation members 43 are each a one-piece, unitary member that is movably mounted relative to the pedal body 22 between a first (initial) position and a second position. The actuation members 43 are biased towards their first (initial) positions. In the first illustrated embodiment, the actuation members 43 are pivotally mounted to the pedal body 22 on the pivot pins 44 by the mounting portions 43a for movement between the first and second positions. The actuation members 43 are also movably mounted relative to the pedal body 22 in the axial direction along the pivot pins 44, respectively. Each of the actuation members 43 is biased towards their first (initial) positions by a return spring 48. The return springs 48 are operatively arranged between the pedal body 22 and a respective one of the actuation members 43. Each of the return springs 48 constitutes a second biasing member that biases respective one of the actuation members 43 towards the first or initial positions. In the first illustrated embodiment, the return springs 48 are torsion springs. The return springs 48 each have a coiled portion disposed on a support pin 49 that is mounted between the first and second side members 31 and 32 of the pedal body 22. Also each of the return springs 48 has one of its free ends engaged in a recess 34a of a respective one of the cage plates 34, and the other free ends of the return springs 48 contact a respective one of the spring contact portions 43c of the corresponding one of the actuation members 43.

A positioning structure 50 is provided between the pedal body 22 and each of the cleat engagement members 42 to selectively retain the cleat engagement members 42 in their engagement positions. In the first illustrated embodiment, each of the positioning structures 50 includes a first positioning element 51, a second positioning element 52 and a spring 53 (i.e., a biasing element). In each of the positioning structures 50, the first and second positioning elements 51 and 52 together with the spring 53 are configured and arranged to constitute a first clutch mechanism in the form of a one-way clutch. In each of the positioning structures 50, the first positioning element 51 is non-movably fixed to a respective one of the cleat engagement members 42, while the second positioning element 52 is mounted to the first side member 31 of the pedal body 22. The springs 53 are coiled compression springs that are mounted on a respective one of the pivot pins 44 within the first side member 31 of the pedal body 22. The springs 53 operatively bias a respective one of the cleat engagement members 42 towards the second side member 32 of the pedal body 22. In this way, in each of the positioning structures 50, the first positioning element 51 is biased into engagement with the second positioning element 52 by its respective one of the springs 53. In the first illustrated embodiment, each of the first positioning elements 51 has a plurality of first protrusions or teeth 51a and each of the second positioning elements 52 has a plurality of second protrusions or teeth 52a. In each of the positioning structures 50, the first teeth 51a mesh with the second teeth 52a such that the cleat engagement member 42 can be pivoted respect with to the pedal body 22 on the pivot pin 44 from the release position to the engagement position by the first teeth 51a of the first positioning element 51 ratcheting on the second teeth 52a. However, also in each of the positioning structures 50, the first teeth 51a mesh with the second teeth 52a such that the cleat engagement member 42 cannot be pivoted respect with to the pedal body 22 on the pivot pin 44 from the engagement position to the release position unless the cleat engagement member 42 is moved axially on the pivot pin 44 to disengage the first teeth 51a from the second teeth 52a.

Figure 11:
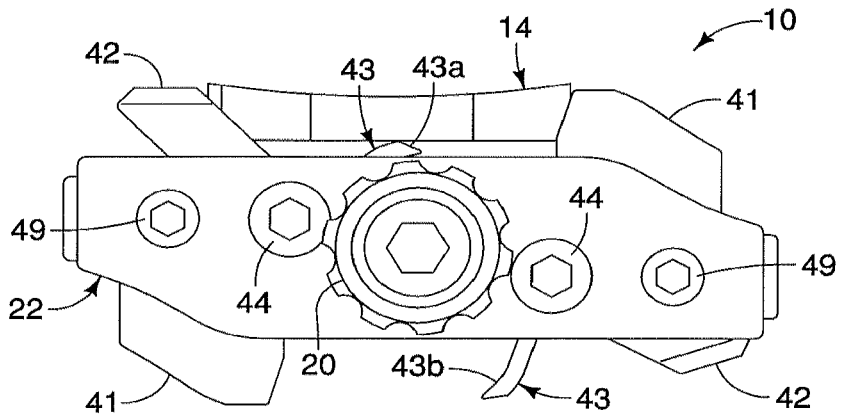
FIG. 11 is an inside elevational view, similar to FIGS. 9 and 10, of the bicycle pedal illustrated in FIGS. 1 to 10, but showing the cleat fully engaged with the cleat engagement member of the bicycle pedal.
Figure 12:
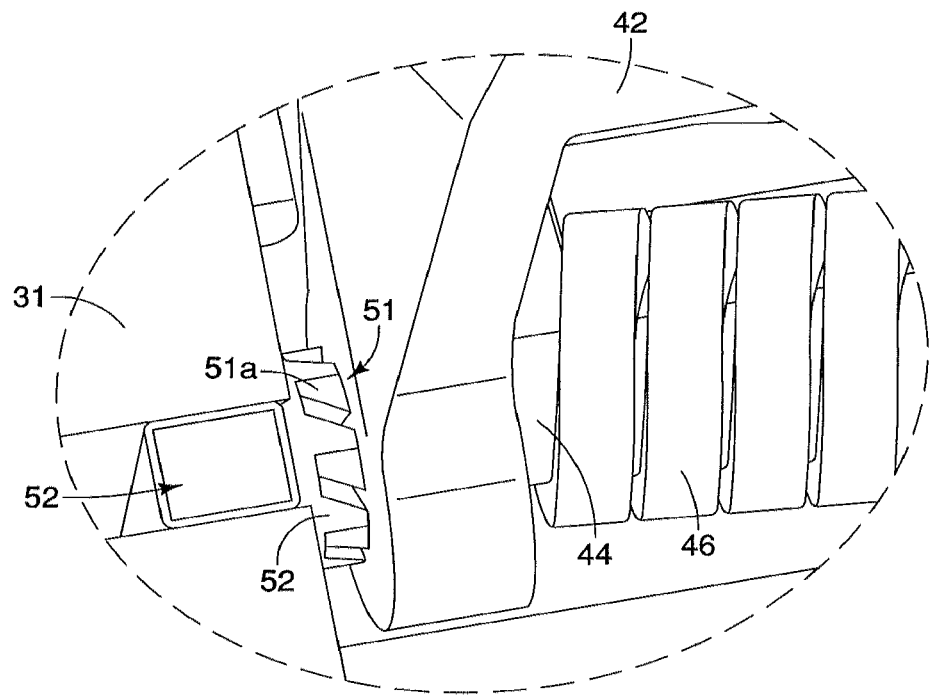
FIG. 12 is a perspective view of a portion of the bicycle pedal illustrated in FIGS. 1 to 11, showing the first clutch mechanism disposed between the bicycle pedal body and the cleat engagement member with the cleat engagement member in the release position.
Figure 13:
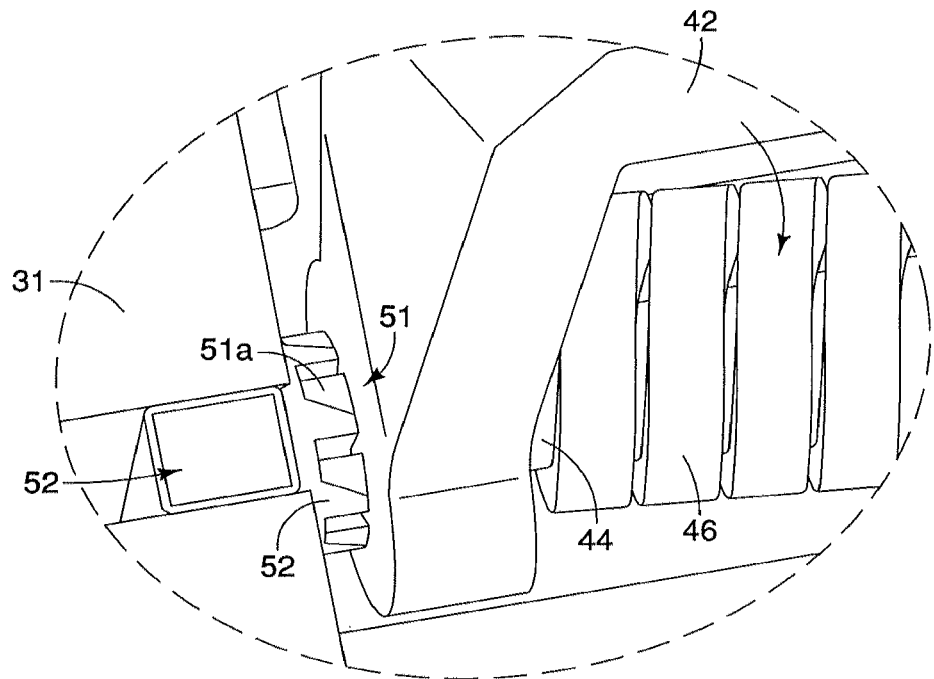
FIG. 13 is a perspective view, similar to FIG. 12, of a portion of the bicycle pedal illustrated in FIGS. 1 to 11, showing the first clutch mechanism disposed between the bicycle pedal body and the cleat engagement member with the cleat engagement member being moved towards the engagement position.
Figure 14:
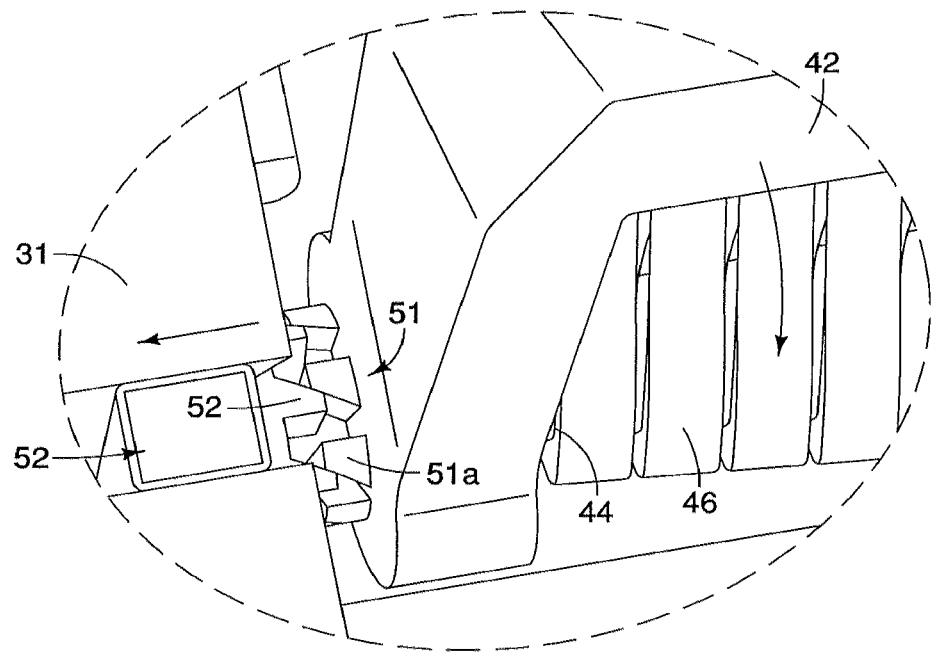
FIG. 14 is a perspective view, similar to FIGS. 12 and 13, of a portion of the bicycle pedal illustrated in FIGS. 1 to 11, showing the first clutch mechanism disposed between the bicycle pedal body and the cleat engagement member with the cleat engagement member being moved farther with respect to the position in FIG. 13 towards the engagement position.
Figure 15:
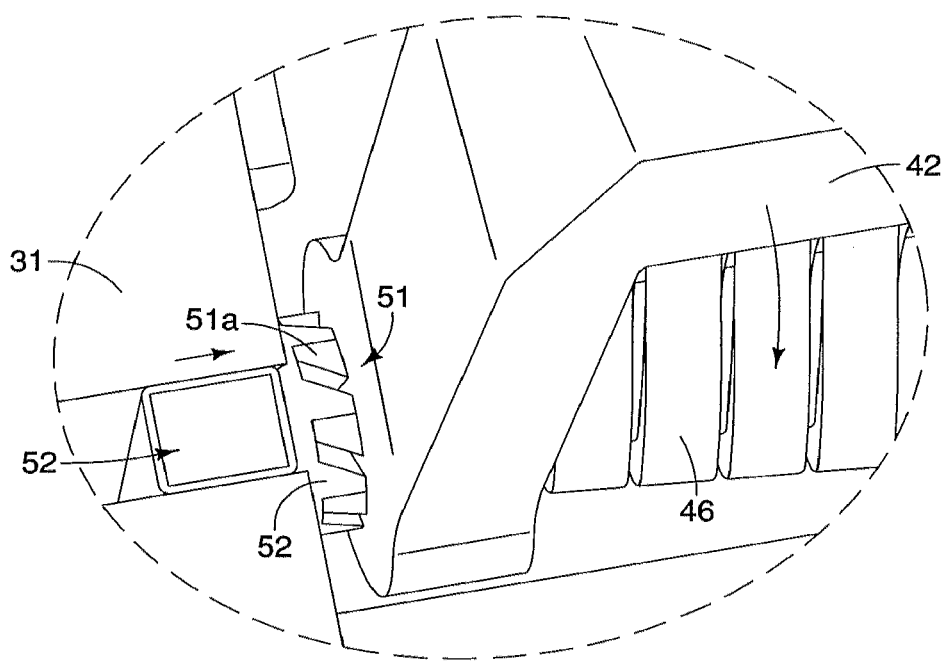
FIG. 15 is a perspective view, similar to FIGS. 12 to 14, of a portion of the bicycle pedal illustrated in FIGS. 1 to 11, showing the first clutch mechanism disposed between the bicycle pedal body and the cleat engagement member with the cleat engagement member moved to the engagement position from FIG. 14.
Figure 16:
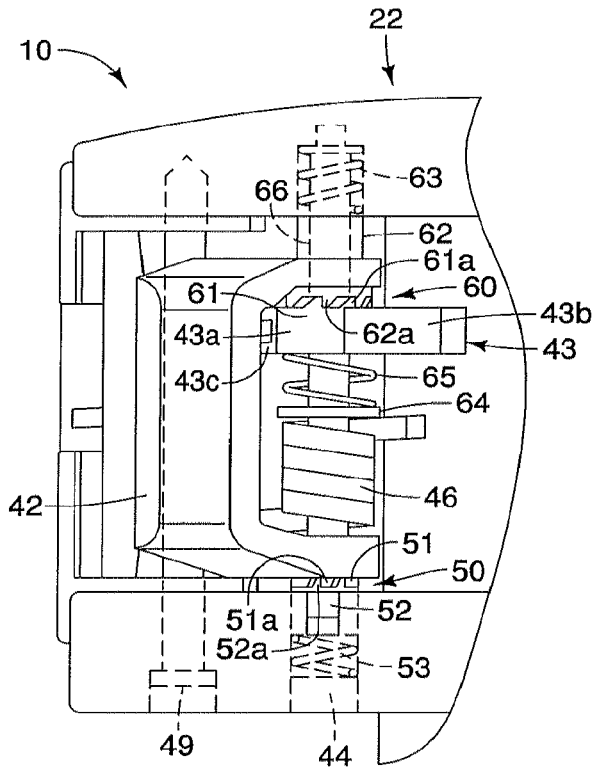
FIG. 16 is a partial top plan view of the bicycle pedal illustrated in FIGS. 1 to 11, showing the cleat engagement member disposed in the engagement position.
Figure 17:
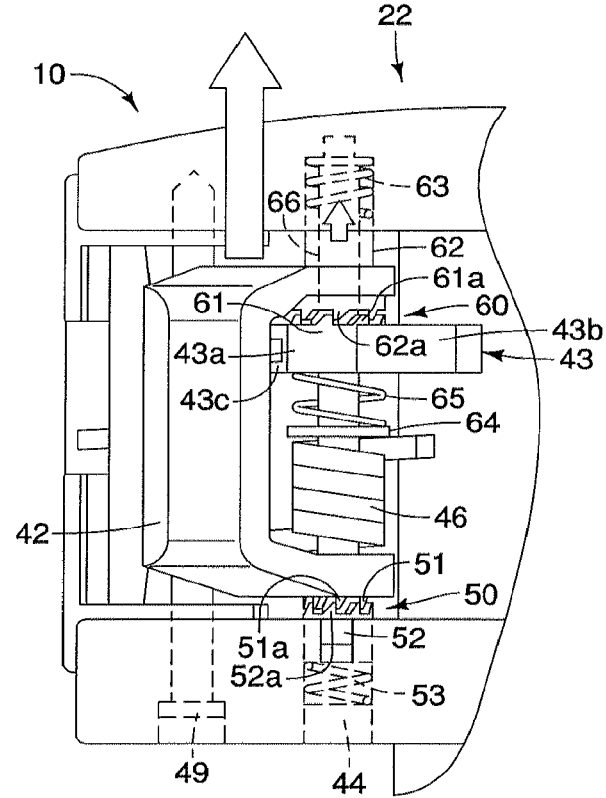
FIG. 17 is a partial top plan view, similar to FIG. 16, of the bicycle pedal illustrated in FIGS. 1 to 11, showing the cleat engagement member being laterally shifted to start a release operation.
Figure 18:
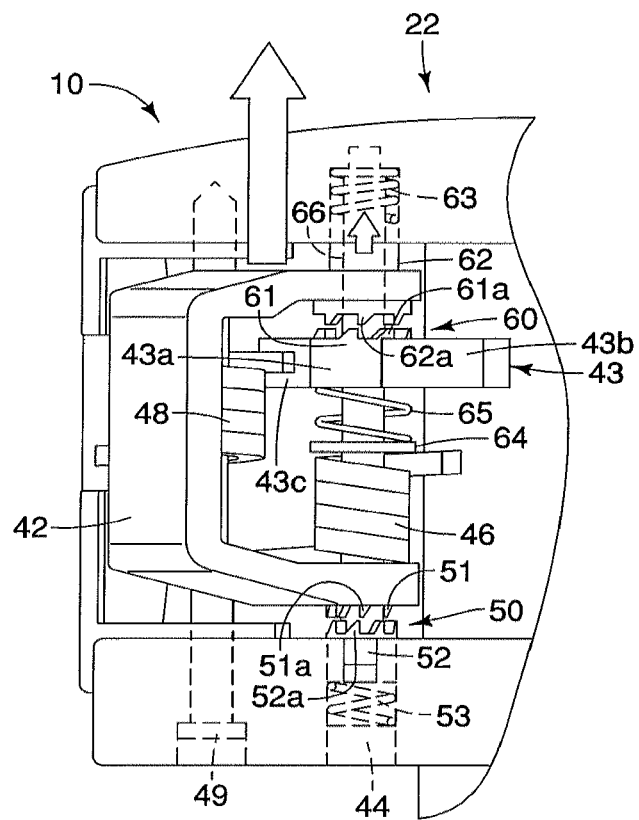
FIG. 18 is a partial top plan view, similar to FIGS. 16 and 17, of the bicycle pedal illustrated in FIGS. 1 to 11, showing the cleat engagement member being laterally shifted farther with respect to the position in FIG. 17 to perform the release operation.
Figure 19:
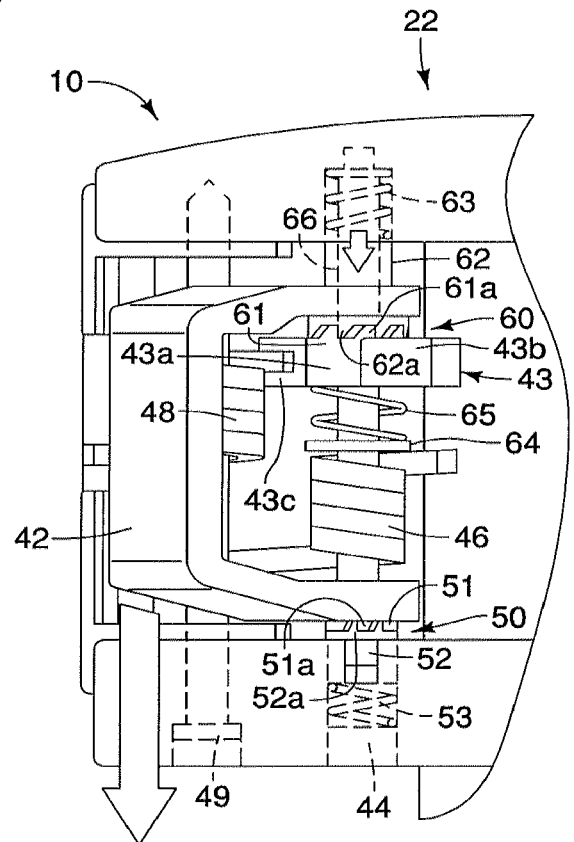
FIG. 19 is a partial top plan view of the bicycle pedal illustrated in FIGS. 1 to 11, showing the cleat engagement member disposed in the release position.
Figure 20:
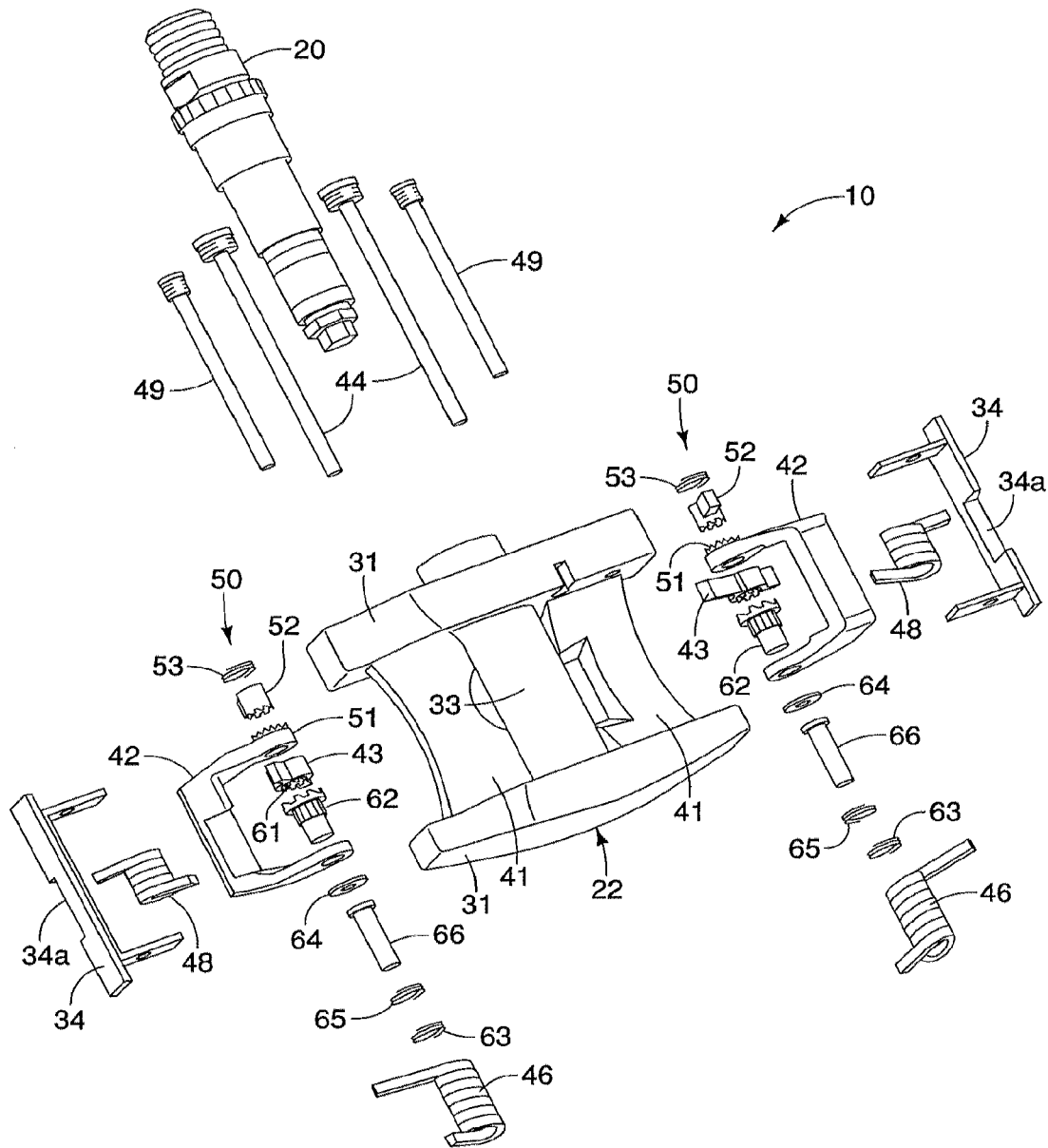
FIG. 20 is an exploded perspective view of the bicycle pedal illustrated in FIGS. 1 to 11.

The actuation members 43 are each movably mounted relative to the pedal body 22 from a first position (FIG. 9) to a second position (top actuation member in FIG. 11). In the first position, the actuation members 43 are disposed in an extend orientation ready for engagement by the rider's shoe for moving the respective one of the cleat engagement members 42 from the release position and the engagement position. In the second position, the actuation member 43 is disposed in a retracted orientation with the respective cleat engagement member 42 in the engagement position. The cleat engagement member 42 and the actuation member 43 are separate members.

In the first illustrated embodiment, as been seen in FIGS. 16 to 19, the actuation members 43 are each mechanically connected to its respective one of the cleat engagement member 42 by a one-way clutch 60. The one-way clutch 60 constitutes a second clutch mechanism of the pedal 10. The one-way clutch 60 selectively fixes the actuation member 43 to the cleat engagement member 42. In particular, the actuation member 43 and the cleat engagement member 42 move together relative to the pedal body 22 as the actuation member 43 moves from the first position to the second position in response to the rider stepping on the actuation member 43. In this way, the actuation member 43 moves the cleat engagement member 42 from the release position to the engagement position via the one-way clutch 60. However, the actuation member 43 also moves relative to the cleat engagement member 42 when the rider initially moves the cleat engagement member 42 axially along its respective pivot pin 44 to release the cleat engagement member 42 from the engagement position to the release position. In this way, the cleat engagement member 42 can immediately move from the engagement position to the release position in response to the positioning structure 50 being released while the cleat 14 is still holding the actuation member 43 in its second position.

In the first illustrated embodiment, each of the one-way clutches 60 includes a first connecting element 61, a second connecting element 62 and a spring 63 (i.e., a biasing element). The first and second connecting elements 61 and 62 and the spring 63 are all mounted on the pivot pin 44. The first connecting element 61 is fixedly coupled to the actuation member 43 to move with the actuation member 43. The second connecting element 62 is fixedly coupled to the cleat engagement member 42. The spring 63 biases the first and second connecting elements 61 and 62 together to an engaged position. In the first illustrated embodiment, the first connecting element 61 and the actuation member 43 are formed as a one-piece, unitary member. However, the first connecting element 61 can be fixed to the actuation member 43 in other ways as needed and/or desired. Also in the first illustrated embodiment, the second connecting element 62 is a tubular member with external splines that engage internal splines of the cleat engagement member 42 to fix the second connecting element 62 to the cleat engagement member 42. However, the second connecting element 62 can be fixed to the cleat engagement member 42 in other ways as needed and/or desired. The spring 63 biases the second connecting element 62 and the cleat engagement member 42 towards the first connecting element 61 on the actuation member 43.

In the first illustrated embodiment, each of the first connecting elements 61 has a plurality of first protrusions or teeth 61*a* and each of the second connecting elements 62 has a plurality of protrusions or second teeth 62*a*. In each of the one-way clutches 60, the first teeth 61*a* mesh with the second teeth 62*a* such that the cleat engagement member 42 is pivoted with the actuation member 43 in response to the actuation member 43 being stepped on so as to move from the initial or first position to the second position. However, the first teeth 61*a* further mesh with the second teeth 62*a* such that can be pivoted respect with to the pedal body 22 on the pivot pin 44 from the release position to the engagement position by the first teeth 51*a* of the first positioning element 61 ratcheting on the second teeth 52*a*. Thus, in each of the one-way clutches 60, the first teeth 61*a* mesh with the second teeth 62*a* such that the cleat engagement member 42 cannot be pivoted respect with to the actuation member 43 on the pivot pin 44 from the engagement position to the release position unless the cleat engagement member 42 is moved axially on the pivot pin 44 to disengage the first teeth 61*a* from the second teeth 62*a* and to disengage the first teeth 51*a* from the second teeth 52*a*. However, also in each of the one-way clutches 60, the first teeth 61*a* are also configured to mesh with the second teeth 62*a* such that the actuation member 43 can ratcheting on the second teeth 62*a* if the cleat engagement member 42 has returned to its release position before the actuation member 43 has returned to its release position. In this way, the cleat engagement member 42 is free to return to its release position before the actuation member 43 returns to its release position.

In the first illustrated embodiment, a washer 64, a spring 65 (i.e., a biasing element) and a sleeve 66 are provided for maintaining the position of the actuation member 43 on the pivot pin 44. The pivot pin 44 passes through the washer 63, the spring 65 and the sleeve 64. The sleeve 64 also passes through the cleat engagement member 42 and the second connecting element 62. The washer 64 is disposed between the return spring 46 and the spring 65. The spring 65 biases the actuation member 43 toward the second connecting element 62 such that the first teeth 61*a* coupled to the actuation member 43 engage the second teeth 62*a* coupled to the cleat engagement member 42. The actuation member 43 is movably coupled to the pivot pin 44 to move axially along the pivot pin 44. The actuation member 43 is also movably on the pivot pin 44 to pivot about the axis of the pivot pin 44. The sleeve 66 prevents the movement of the actuation member 43 toward the second side member 32. In particular, the sleeve 66 has a first end abutting the pedal body 22 and a second end with a flange limits the movement of the actuation member 43 toward the second side member 32.

When the first teeth 61*a* and the second teeth 62*a* are engaged, the actuation member 43 can move from the second (step-in) position back to the first (initial) position by the return spring 48 because actuation member 43 can move toward the first side member 31 against the biasing force of the spring 65. The biasing force of the spring 53 is in the opposite direction to the biasing force of the spring 63. However, the biasing force of the spring 53 approaches zero when the second connecting element 62 and the cleat engagement member 42 are laterally shifted on the pivot pin 44 to compress the spring 65 and perform a release operation. Alternatively, the pedal body 22 is provided with a holding portion which prevents the second positioning element 52 from moving towards the second side member 32. In this case, the biasing force of the spring 65 does not have to approach zero when the second connecting element 62 and the cleat engagement member 42 are laterally shifted on the pivot pin 44 to compress the spring 65 and perform a release operation.

In a step-in operation, when the cleat 14 is engaged with the pedal 10, the actuation member 43 is pushed down by a shoe 12 or the cleat 14, the cleat engagement member 42 is moved to its engagement position. When the cleat engagement member 42 moves from the release position to the engagement position, the first teeth 51*a* ratcheting on the second teeth 52*a* as illustrated in FIGS. 12 to 15 due to the second connecting element 62 moving axially on the pivot pin 44 against the biasing force of the spring 53. Then the cleat engagement member 41 is held at its engagement position.

When the cleat 14 is to be disengaged from the pedal 10, the cleat engagement member 42 is moved in a lateral direction along the pivot pin 44 as illustrated in FIGS. 16 to 19. After the cleat engagement member 42 is moved in a lateral direction along the pivot pin 44, the second teeth 52*a* are disengaged from the first teeth 51*a*. The disengagement of the second teeth 52*a* from the first teeth 51*a* then allows the cleat engagement member 42 to move to its open or release position by the return spring 46.

Figure 21:
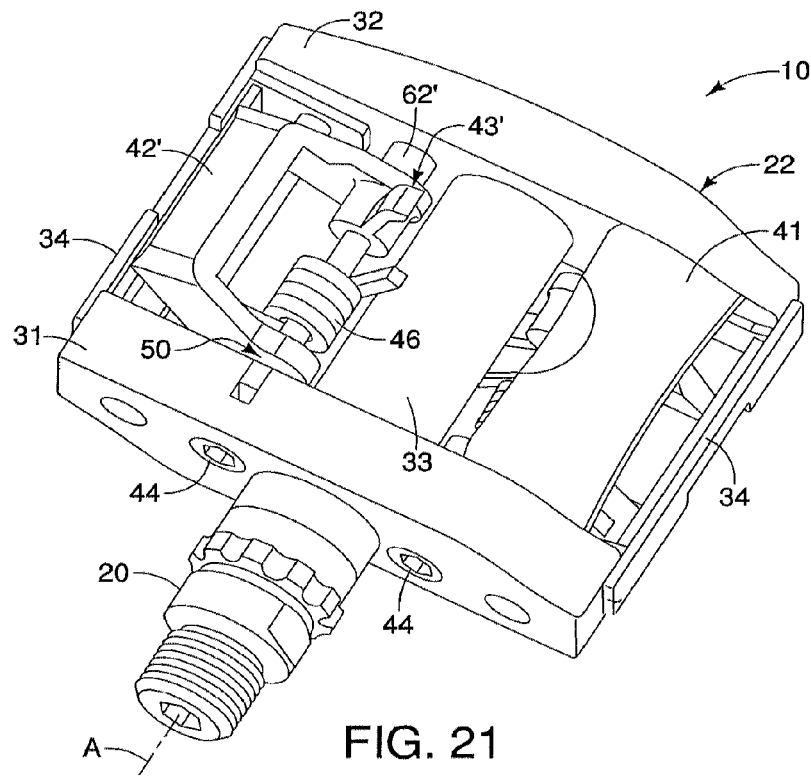
FIG. 21 is a perspective view of the bicycle pedal illustrated in FIGS. 1 to 11, but with modified cleat engagement members having integrated actuation members.
Figure 22:
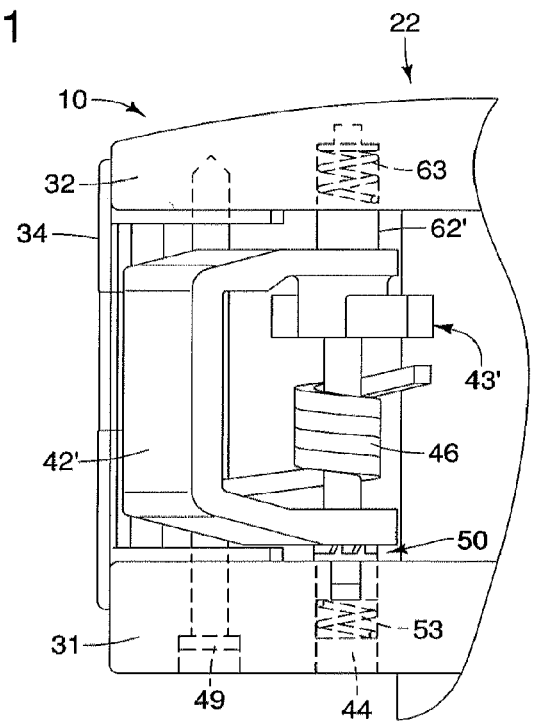
FIG. 22 is a partial top plan view of the bicycle pedal illustrated in FIG. 21, showing the cleat engagement member in the release position.

Referring now to FIGS. 21 and 22, the bicycle pedal 10 has been modified such that an alternate cleat engagement member 42' is used instead of the cleat engagement member 42 in the pedal 10 that is illustrated in FIGS. 1 to 20. Since the alternate cleat engagement member 42' is used in the pedal 10 that is illustrated in FIGS. 1 to 20, the parts that remain unchanged will not be discussed again with respect to the alternate cleat engagement member 42'. Basically, by using the alternate cleat engagement member 42', the bicycle pedal 10 is simplified. In particular, the alternate cleat engagement member 42' has an integrated actuation member 43' and integrated second connecting element 62' that eliminate the need for the second clutch mechanism (e.g., the one-way clutch 60).

Figure 23:
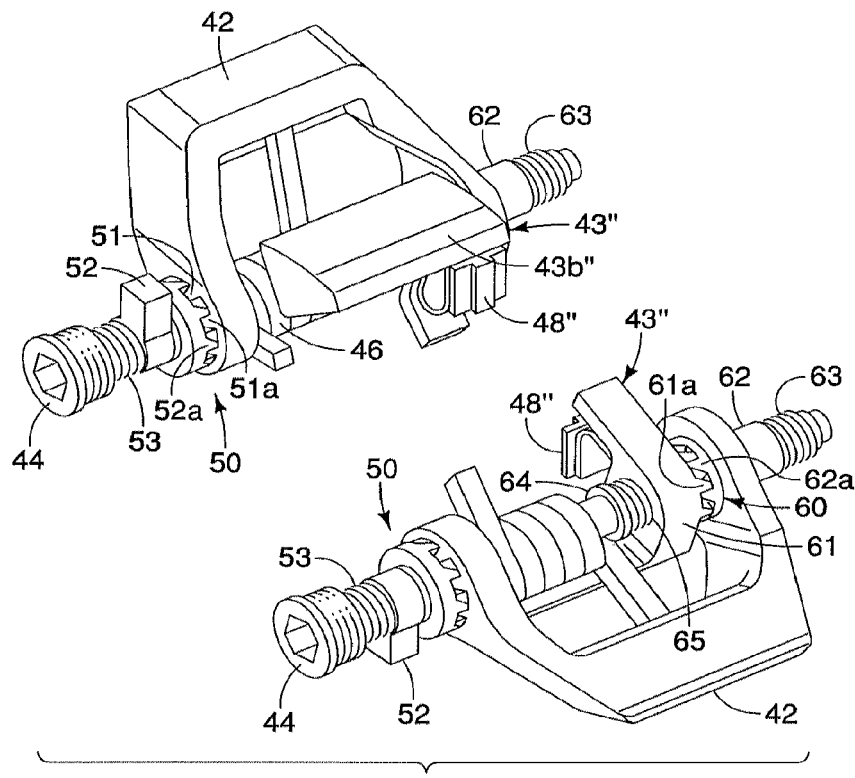
FIG. 23 is a top side perspective view of a pair of the cleat engagement members of the first embodiment being used with modified actuation members.
Figure 24:
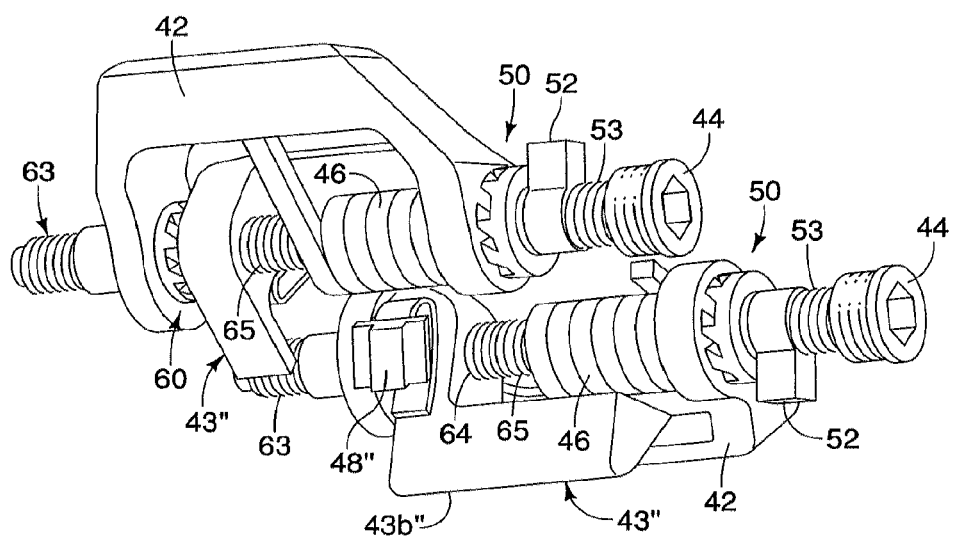
FIG. 24 is a bottom side perspective view of the cleat engagement members and the modified actuation members illustrated in FIG. 23.
Figure 25:
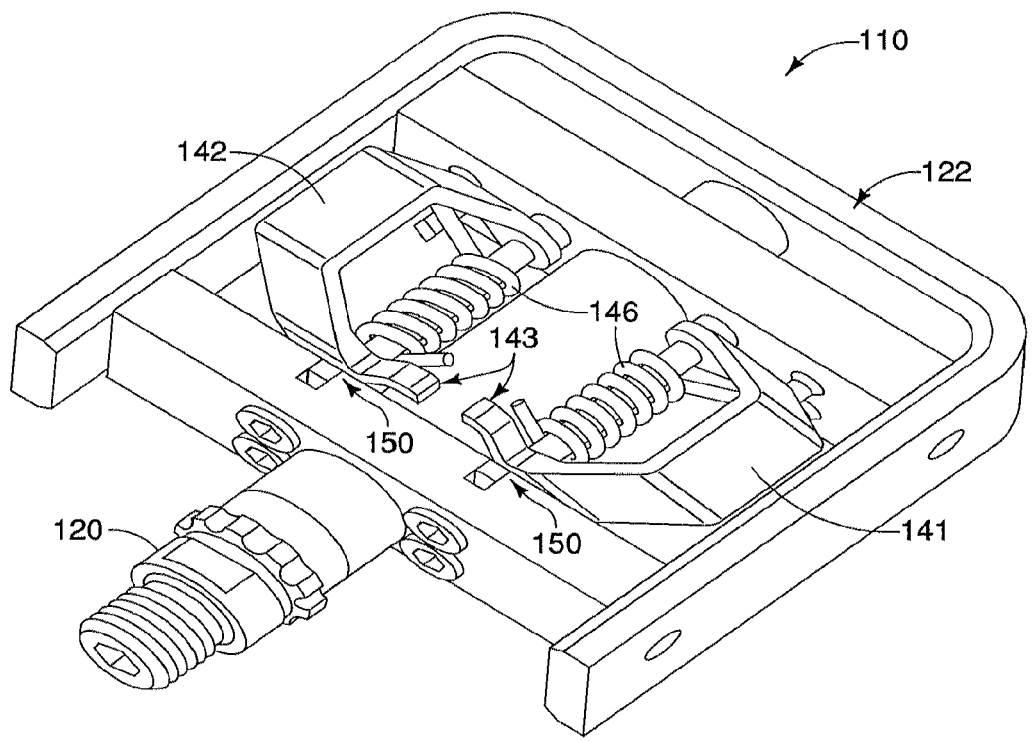
FIG. 25 is a perspective view of a bicycle pedal illustrated in accordance with a second illustrated embodiment, showing the cleat engagement members in their engagement positions.
Figure 26:
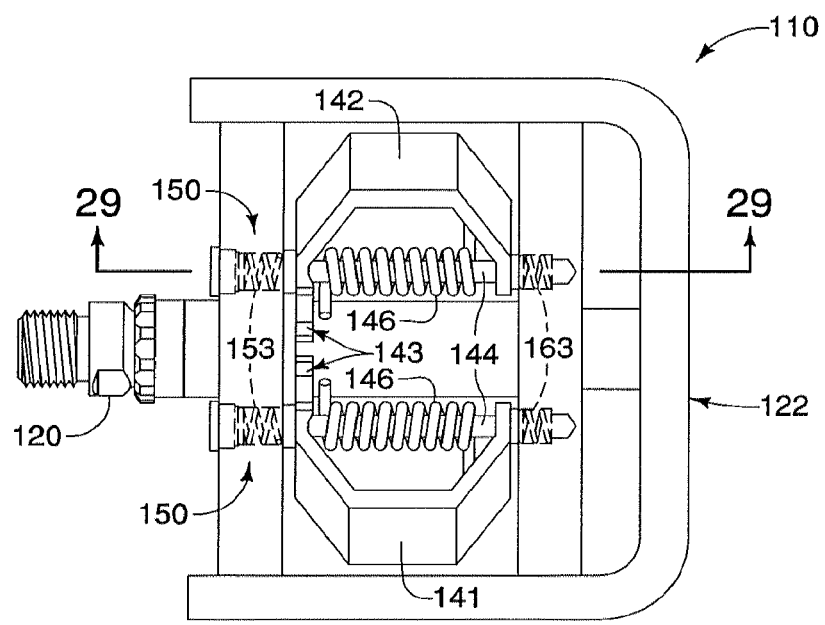
FIG. 26 is a top plan view of the bicycle pedal illustrated in FIG. 25, showing the cleat engagement members in their engagement positions.

Referring now to FIGS. 23 and 24, an alternate actuation member 43" is illustrated that is used instead of the actuation member 43 in the pedal 10 that is illustrated in FIGS. 1 to 20. Since the alternate actuation member 43" is used in the pedal 10 that is illustrated in FIGS. 1 to 20, the parts that remain unchanged will not be discussed again with respect to the alternate actuation member 43". Basically, by using the alternate actuation member 43", the bicycle pedal 10 is simplified. In particular, the alternate actuation member 43" has a spring 48" that eliminates the need for a torsion spring and a support pin. The spring 48" is a U-shape leaf spring (i.e., a biasing element). One end of the spring 48" is coupled to the alternate actuation member 43". The other end of the spring 48" contacts the tubular spindle supporting member 33 of the pedal body to bias the alternate actuation member 43" towards a first or initial position in which the rider can step on the alternate actuation member 43" to move the cleat engagement member 42 from the release position to the engaged position in a similar manner as discussed above. A cleat contact portion 43b" of the alternate actuation member 43" is wider than the mounting portion 43a with respect to the pedal axis A. The cleat contact portion 43b" provides for easy step-in surface for the cleat 14.

Figure 27:
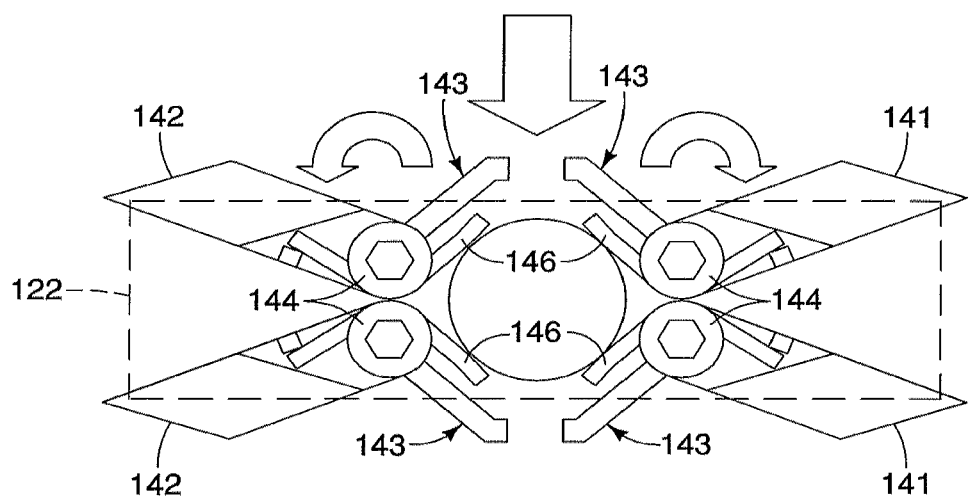
FIG. 27 is a simplified side schematic view of the bicycle pedal illustrated FIGS. 25 and 26, showing the cleat engagement members in their release positions.
Figure 28:
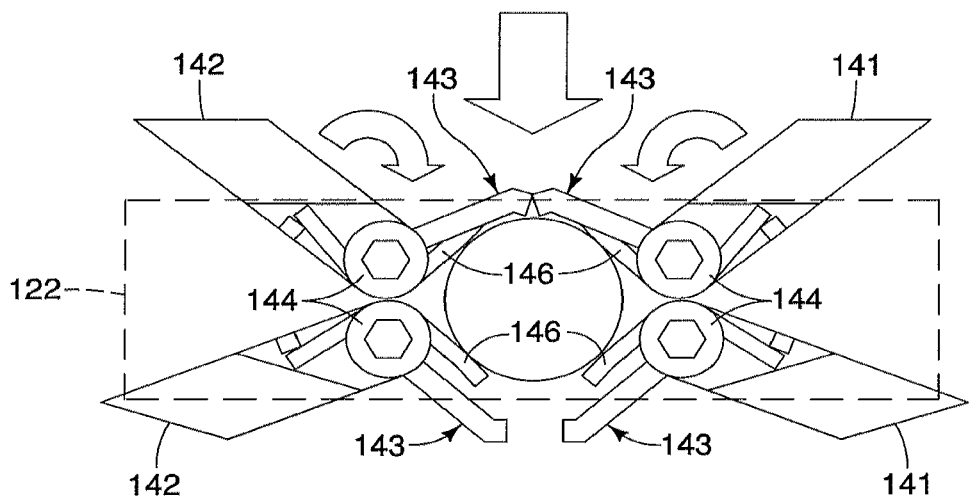
FIG. 28 is a simplified side schematic view, similar to FIG. 27, of the bicycle pedal illustrated FIGS. 25 to 27, showing the top pair of the cleat engagement members moved to their engagement positions.
Figure 29:
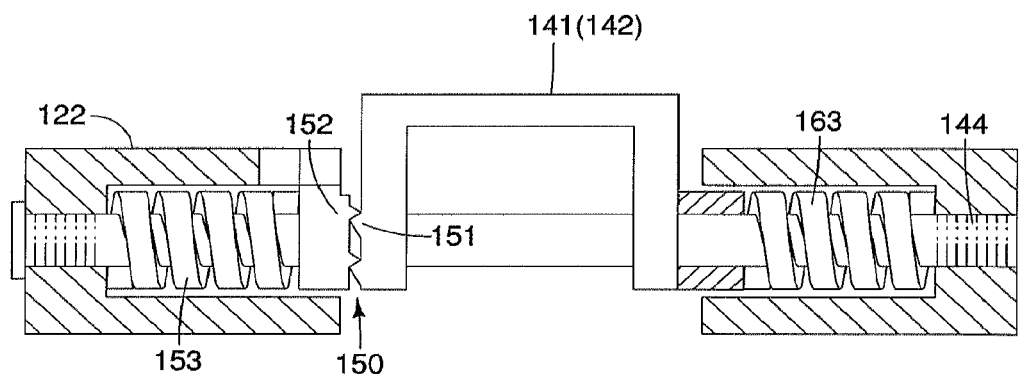
FIG. 29 is a simplified cross sectional view of the bicycle pedal illustrated FIGS. 25 to 28, as seen along section line 29-29 of FIG. 26, showing a positioning structure of one of the cleat engagement members in an engaged position.

Referring now to FIGS. 25 to 34, a bicycle pedal 110 is illustrated in accordance with a second illustrated embodiment. Basically, the bicycle pedal 110 is a modified version of the bicycle pedal 10 that uses the alternate cleat engagement member 42'. The bicycle pedal 110 is designed to be used with the bicycle shoe 12 and the cleat 14 of FIG. 1. However, the bicycle pedal 110 includes a pedal spindle or axle 120 and a pedal body 122 in which both front and rear cleat engagement members 141 and 142 are pivotally mounted to the pedal body 122. Each of the front and rear cleat engagement members 141 and 142 is provided with an integrated actuation member 143. Each of the front and rear cleat engagement members 141 and 142 is pivotally mounted to the pedal body 122 via a pivot pin 144. Springs 146 are provided to bias the front and rear cleat engagement members 141 and 142 to their release positions as seen in FIG. 27. As diagrammatically illustrated in FIGS. 27 and 28, the actuation members 143 are step-in actuation members that are operated by a rider stepping on two of the actuation members 143 to move a pair of the cleat engagement members 141 and 142 from their release positions and their engagement positions. Each pair of the cleat engagement members 141 and 142 has first and second cleat contact surfaces, respectively that face the pedal body 122 to define a cleat retaining area lying on one side of the reference plane that passes through a center spindle axis of the pedal spindle 120.

Figure 30:
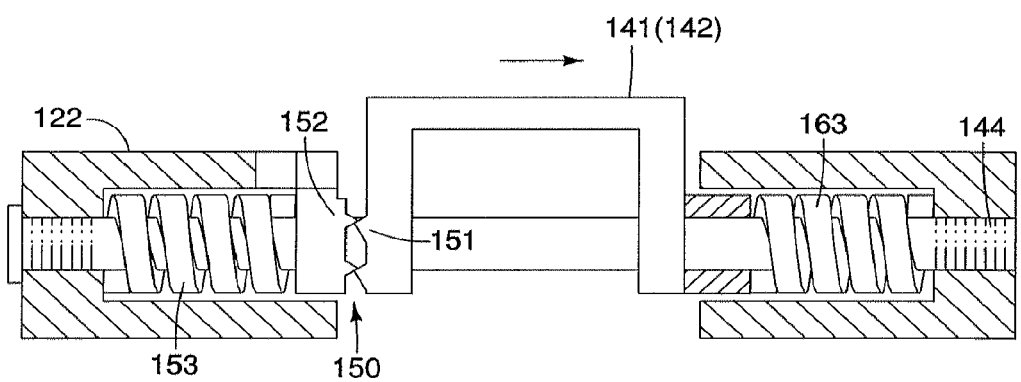
FIG. 30 is a simplified cross sectional view, similar to FIG. 29, of the bicycle pedal illustrated FIGS. 25 to 28, showing the positioning structure of the cleat engagement member in a disengaged position.
Figure 31:
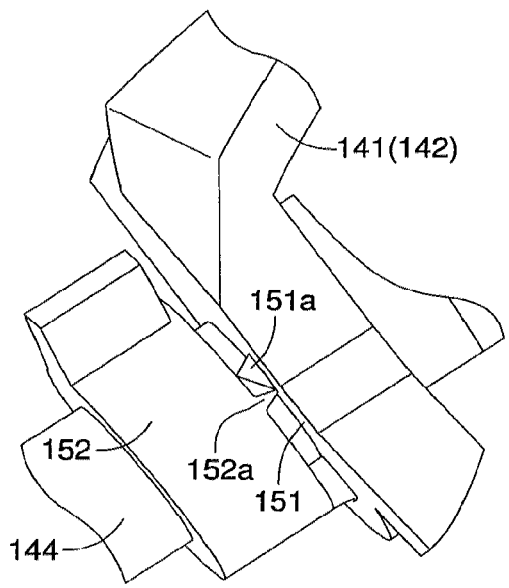
FIG. 31 is a partial perspective view of a portion of the bicycle pedal illustrated in FIGS. 25 to 28, showing the positioning structure of the cleat engagement member in a disengaged position.
Figure 32:
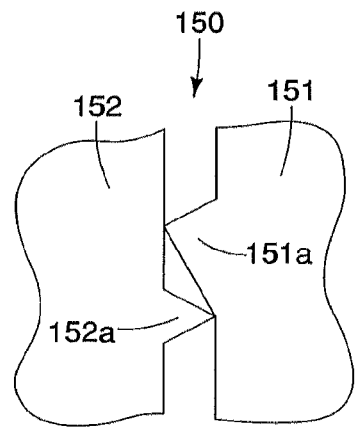
FIG. 32 is a partial diagrammatic view of the positioning structure illustrated in FIG. 31, with the positioning structure in the disengaged position.

As best seen in FIGS. 29 to 34, a positioning structure 150 is provided between the pedal body 22 and each of the cleat engagement members 141 and 142 to selectively retain the cleat engagement members 141 and 142 in their engagement positions. The basic operation of the positioning structure 150 is the same as the positioning structure 50, discussed above. Here, each of the positioning structures 150 includes a first positioning element 151, a second positioning element 152 and a spring 153. In each of the positioning structures 150, the first and second positioning elements 151 and 152 together with the spring 153 are configured and arranged to constitute a first clutch mechanism in the form of a one-way clutch. Also a release spring 163 is provided for allowing the cleat engagement member 141 or 142 to move to a disengaging position. The biasing force of the spring 163 is in the opposite direction to the biasing force of the spring 153. However, the biasing force of the spring 153 approaches zero when the cleat engagement member 141 or 142 is laterally shifted on the pivot pin 144 to compress the spring 163 as seen in FIG. 30 to perform a release operation. In each of the positioning structures 150, the first positioning element 151 is non-movably fixed to a respective one of the cleat engagement members 141 and 142, while the second positioning element 152 is mounted to the pedal body 22. The springs 153 and 163 are coiled compression springs that are mounted on a respective one of the pivot pins 44. The springs 153 and 163 operatively bias the cleat engagement members 141 and 142 towards a center balanced position in which the positioning structure 150 is engages. In this way, in each of the positioning structures 150, the first positioning element 151 is biased into engagement with the second positioning element 152. Each of the first positioning elements 151 has a plurality of protrusions or first teeth 151a and each of the second positioning elements 152 has a plurality of protrusions or second teeth 152a. In each of the positioning structures 150, the first teeth 151a mesh with the second teeth 512a such that the cleat engagement member 141 or 142 can be pivoted respect with to the pedal body 122 on the pivot pin 144 from the release position to the engagement position by the first teeth 151a of the first positioning element 151 ratcheting on the second teeth 152a. However, also in each of the positioning structures 150, the first teeth 151a mesh with the second teeth 152a such that the cleat engagement member 141 or 142 cannot be pivoted respect with to the pedal body 122 from the engagement position to the release position unless the cleat engagement member 142 is moved axially on the pivot pin 144 to disengage the first teeth 151a from the second teeth 152a.

Figure 33:
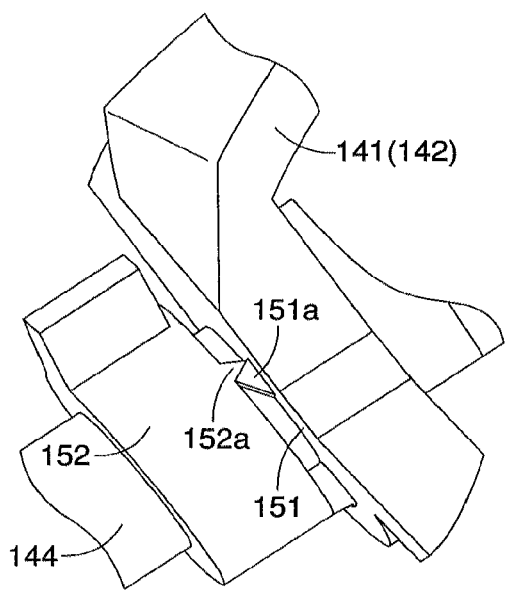
FIG. 33 is a partial perspective view of a portion of the bicycle pedal illustrated in FIGS. 25 to 28, showing the positioning structure of the cleat engagement member in an engaged position.
Figure 34:
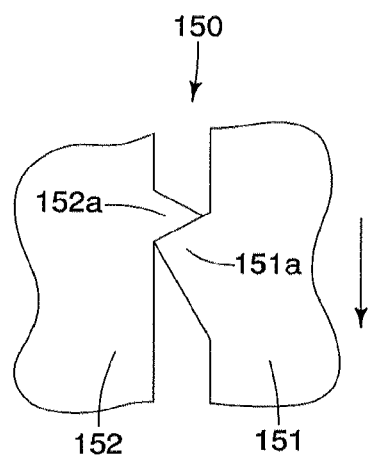
FIG. 34 is a partial diagrammatic view of the positioning structure illustrated in FIG. 33, with the positioning structure in the engaged position.
Figure 35:
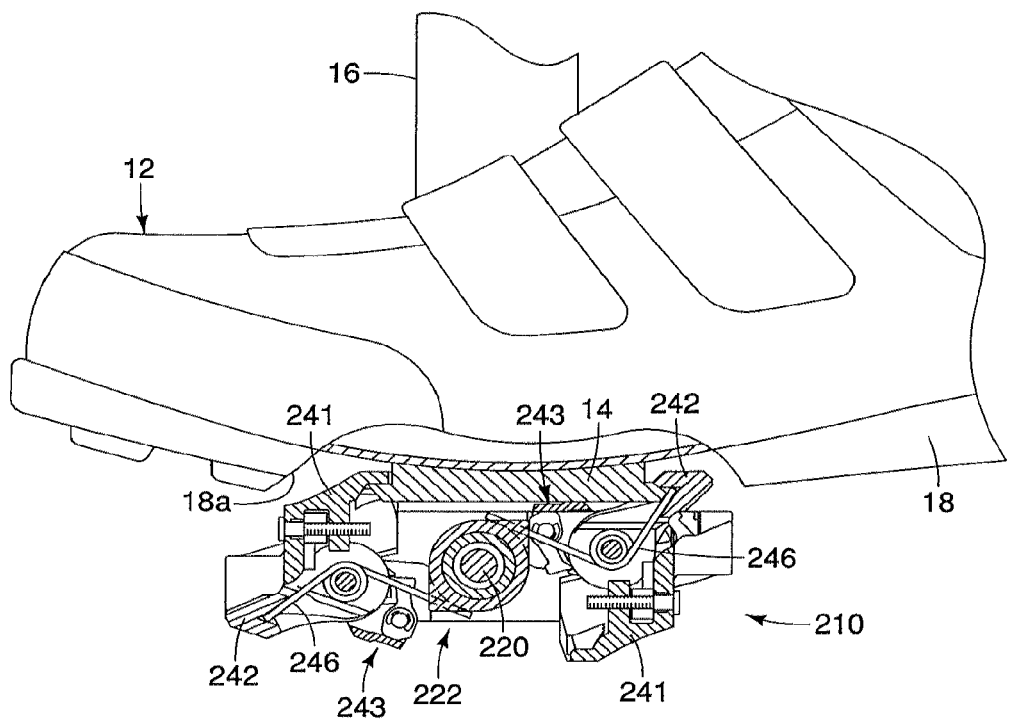
FIG. 35 is an outside elevational view of a bicycle shoe attached to a left bicycle pedal (shown longitudinal cross section) via a cleat of the bicycle shoe in accordance with a third illustrated embodiment.

In a step-in operation, when the cleat 14 is engaged with the pedal 110, the actuation members 143 are pushed down by a shoe 12 or the cleat 14, then two of the cleat engagement members 141 and 142 are moved to their engagement positions. When the cleat engagement members 141 and 142 are disposed in their engagement positions, the first teeth 151a mesh with the second teeth 152a are engaged as illustrated in FIGS. 33 and 34. Then the cleat engagement members 141 and 142 are held at their engagement positions.

When the cleat 14 is to be disengaged from the pedal 110, the cleat engagement members 141 and 142 are moved in a lateral direction along the pivot pins 144 as illustrated in FIG. 30. After the cleat engagement members 141 and 142 are moved in a lateral direction along the pivot pins 144, the second teeth 152a are disengaged from the first teeth 151a. The disengagement of the second teeth 152a from the first teeth 151a then allows the cleat engagement members 141 and 142 to move to their open or release positions by the return springs 146.

Figure 36:
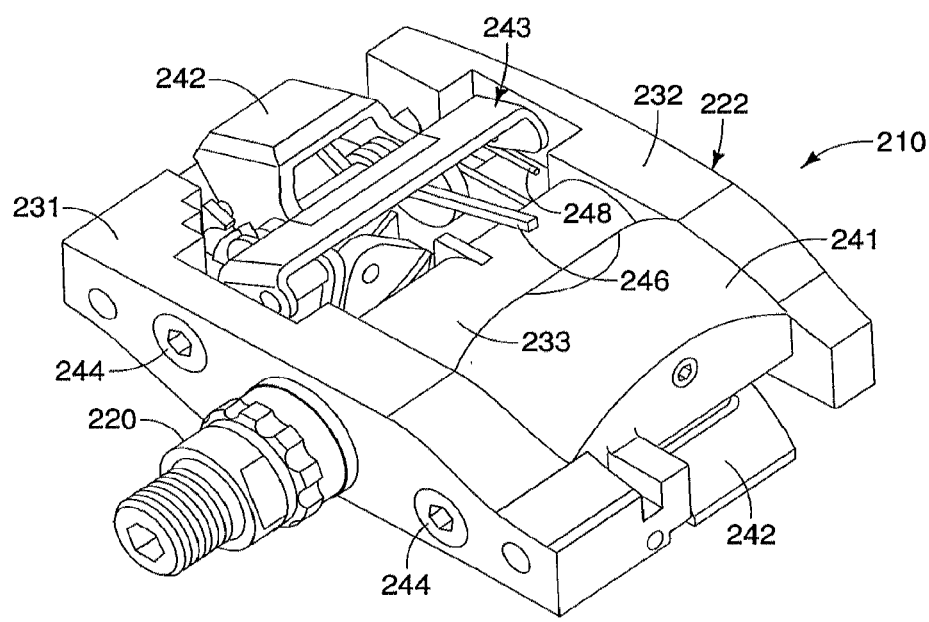
FIG. 36 is a top perspective view of the bicycle pedal illustrated in FIG. 35, showing the cleat engagement member in the release position.

Referring now to FIGS. 35 to 51, a bicycle pedal 210 is illustrated in accordance with a third illustrated embodiment. Basically, the bicycle pedal 210 is used with the bicycle shoe 12 and the cleat 14 as seen in FIG. 36. The bicycle pedal 210 operates in the same manner as the bicycle pedals 10 and 110 in that the cleat 14 is engaged with the pedal 210 with a relatively low engagement force and disengaged from the pedal 210 with a relatively low disengagement force. However, the structure of the pedal 210 is different from the prior embodiments to accomplish the retaining and the releasing of the cleat 14.

Figure 37:
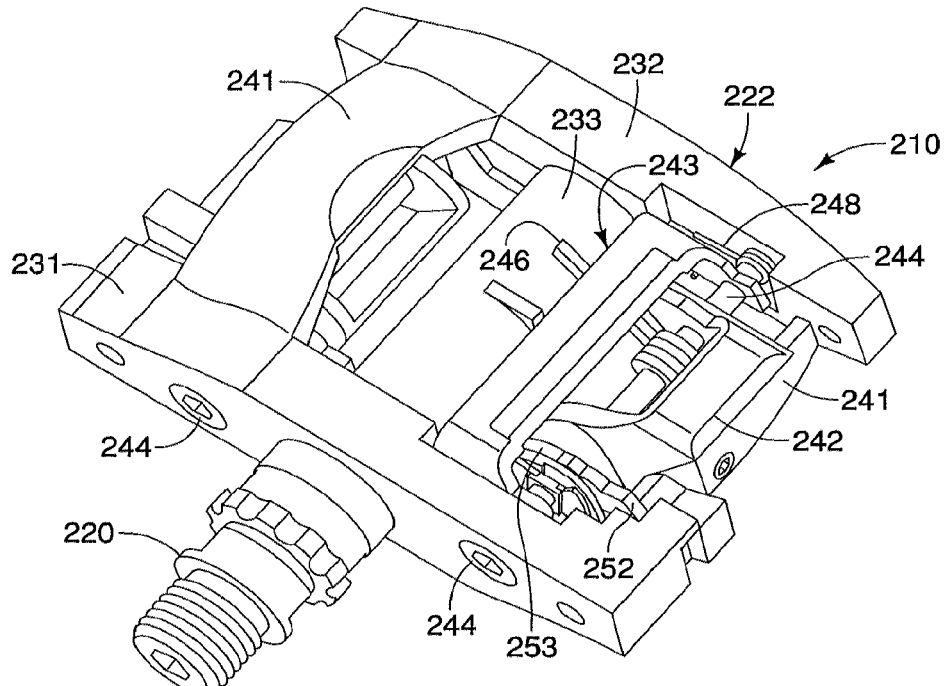
FIG. 37 is another top perspective view of the bicycle pedal illustrated in FIGS. 35 and 36, showing the cleat engaged with the pedal.
Figure 38:
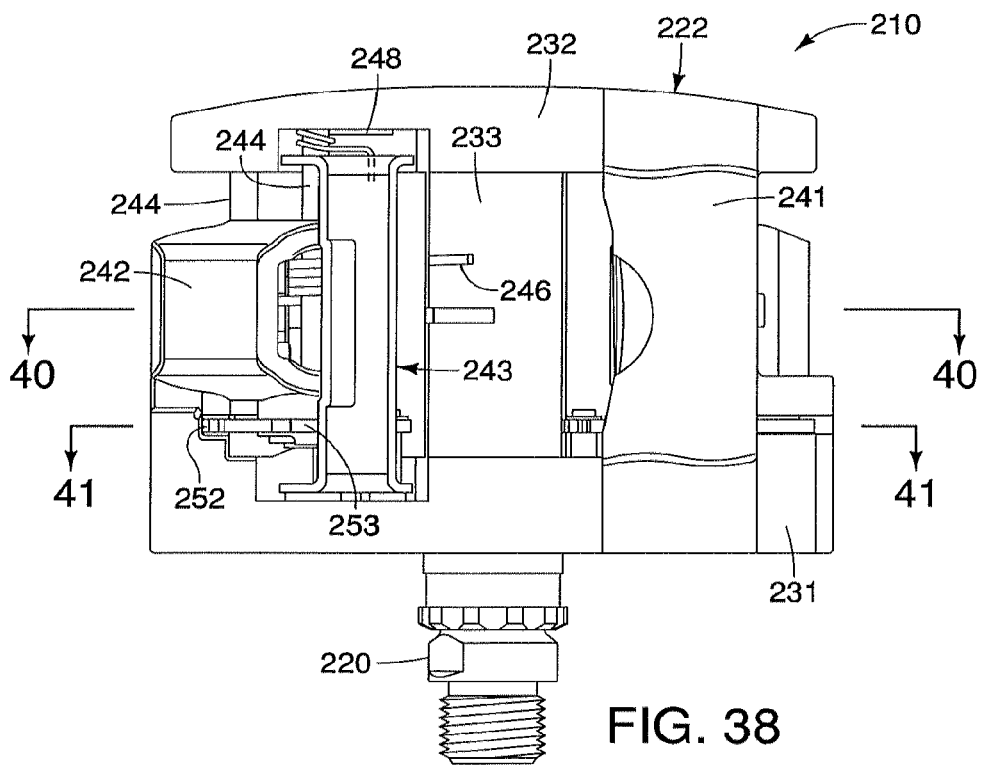
FIG. 38 is a top plan view of the bicycle pedal illustrated in FIGS. 35 to 37, showing the cleat engagement member in the engagement position.
Figure 39:
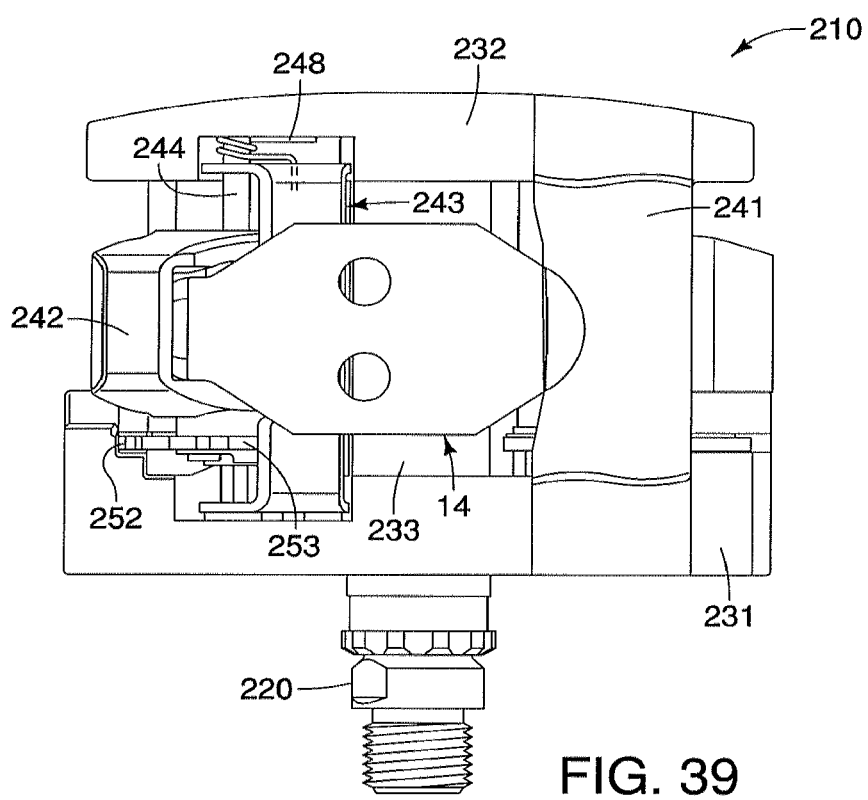
FIG. 39 is a top plan view of the bicycle pedal illustrated in FIGS. 35 to 38, showing a cleat pushing down on the actuator member, but prior to the cleat engagement member in the release position.
Figure 40:
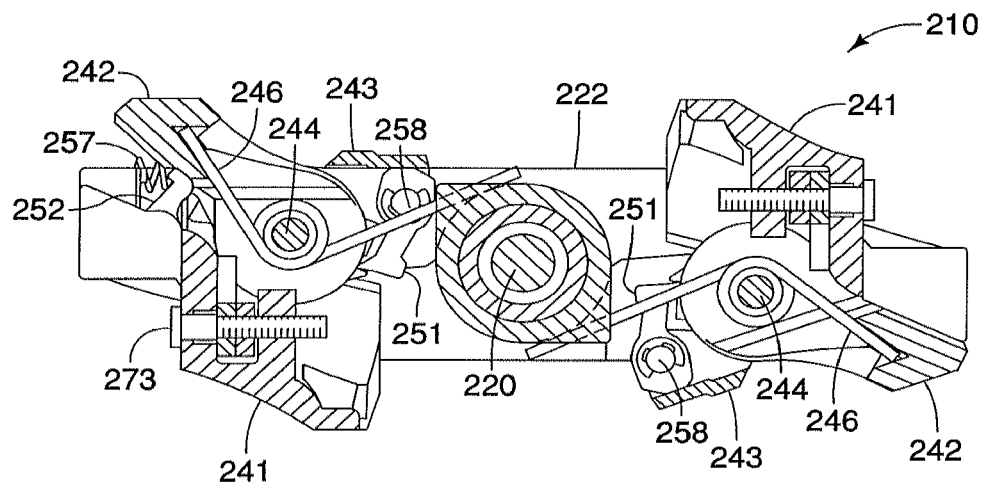
FIG. 40 is a longitudinal cross sectional view of the bicycle pedal illustrated in FIGS. 35 to 39, as seen along section line 40-40 of FIG. 38.

The bicycle pedal 210 includes a pedal spindle or axle 220 and a pedal body 222. The pedal spindle 220 and the pedal body 222 are constructed and function in substantially the same manner as the pedal spindle 20 and the pedal body 22. Thus, the descriptions of the pedal spindle 20 and the pedal body 22 applies to the pedal spindle 220 and the pedal body 222, respectively. As seen in FIG. 37, the pedal body 222 basically includes a first side member 231, a second side member 232 and a tubular spindle supporting member 233. Two front cleat engagement members 241 are fixedly coupled between the first and second members 231 and 232 for engaging a front end of the cleat 14. Also two rear cleat engagement members 242 are movably coupled between the first and second members 231 and 232 for engaging a rear end of the cleat 14.

Each of the rear cleat engagement members 242 has an associated actuation member 243 that moves the associated one of the rear cleat engagement members 242 from a release position to an engagement position in response to a rider stepping on the actuation member 243. Each pair of the cleat engagement members 242 and the associated actuation members 243 are pivotally mounted relative to the pedal body 222 about a single pivot axis. In particular, the rear cleat engagement members 242 and the actuation members 243 are pivotally mounted between the first and second members 231 and 232 of the pedal body 222 by a pair of pivot pins 244. Springs 246 are provided to bias the rear cleat engagement members 242 to their release positions. Springs 248 are provided to bias the actuation members 243 to their initial step-in ready positions.

Figure 41:
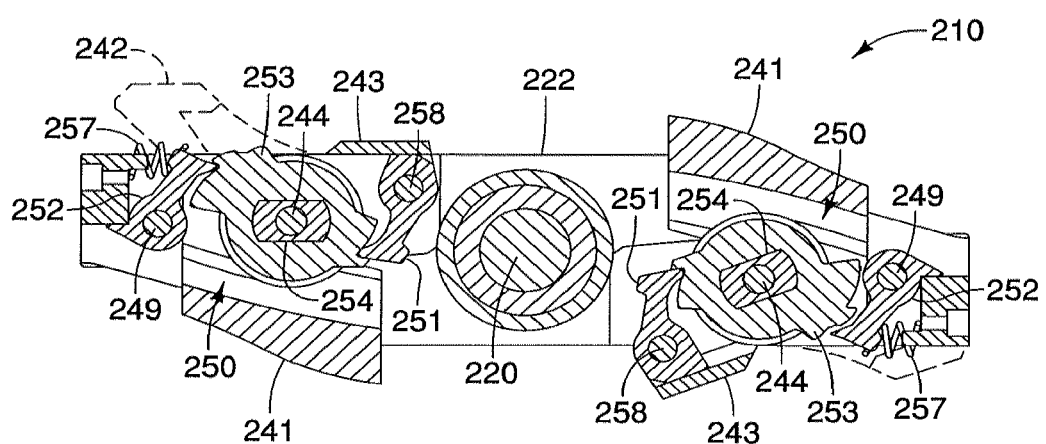
FIG. 41 is a longitudinal cross sectional view of the bicycle pedal illustrated in FIGS. 35 to 40, as seen along section line 41-41 of FIG. 38.
Figure 42:
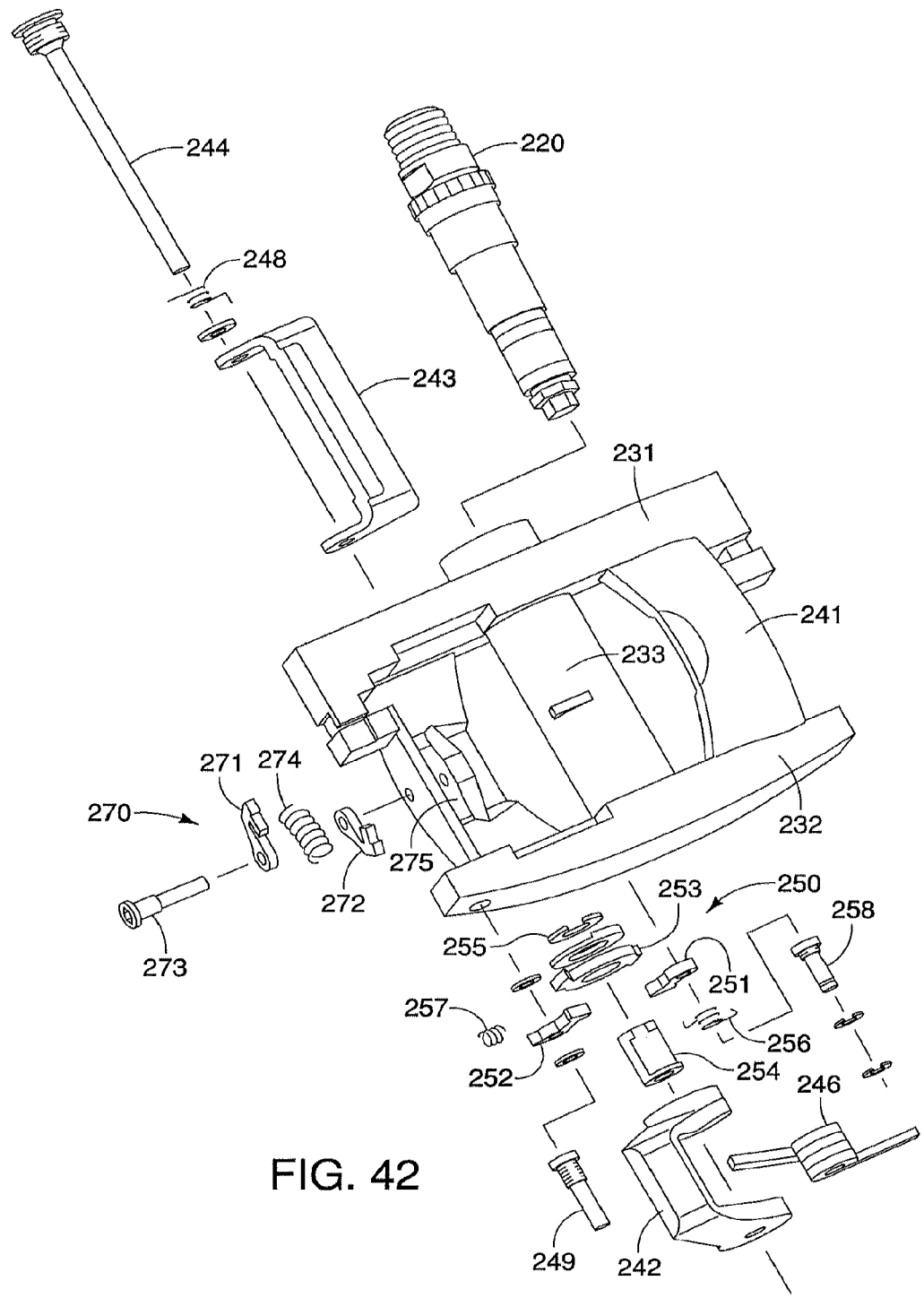
FIG. 42 is an exploded perspective view of the bicycle pedal illustrated in FIGS. 35 to 41.
Figure 43:
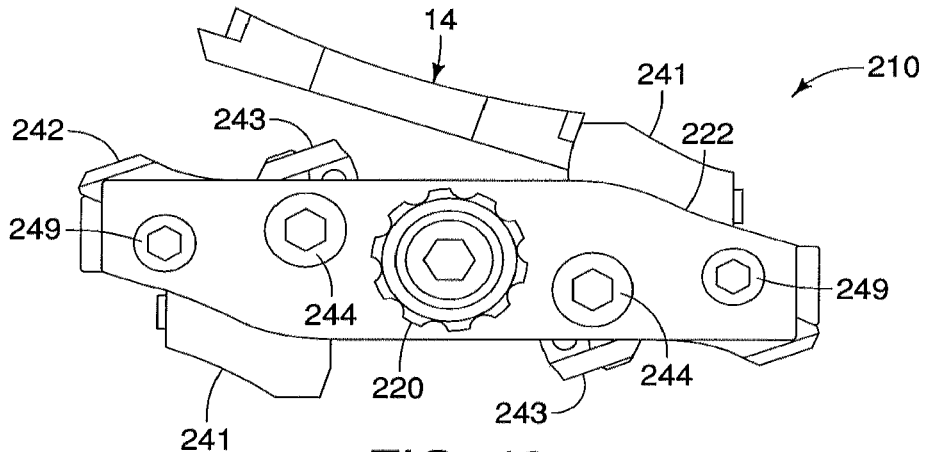
FIG. 43 is an inside elevational view of the bicycle pedal illustrated in FIGS. 36 to 42, showing a front end of the cleat engaged with the bicycle pedal.
Figure 44:
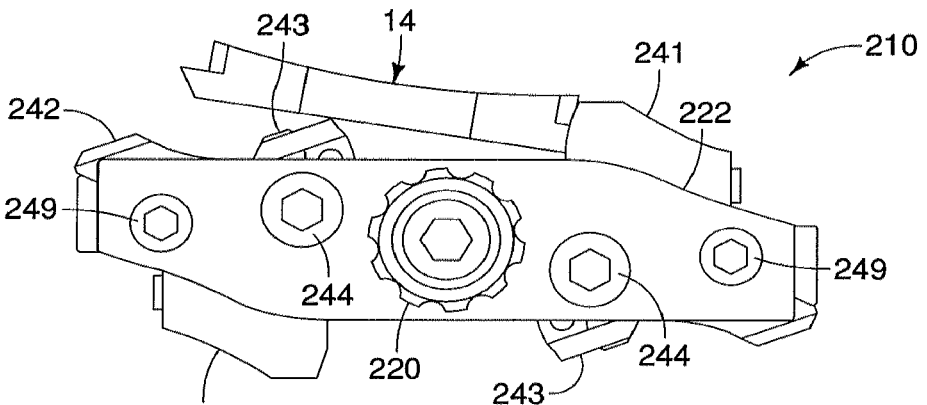
FIG. 44 is an inside elevational view, similar to FIG. 43, of the bicycle pedal illustrated in FIGS. 36 to 43, but showing the bottom surface of the cleat engaged with the actuation member of the bicycle pedal and the cleat engagement member being moved towards the engagement position.
Figure 45:
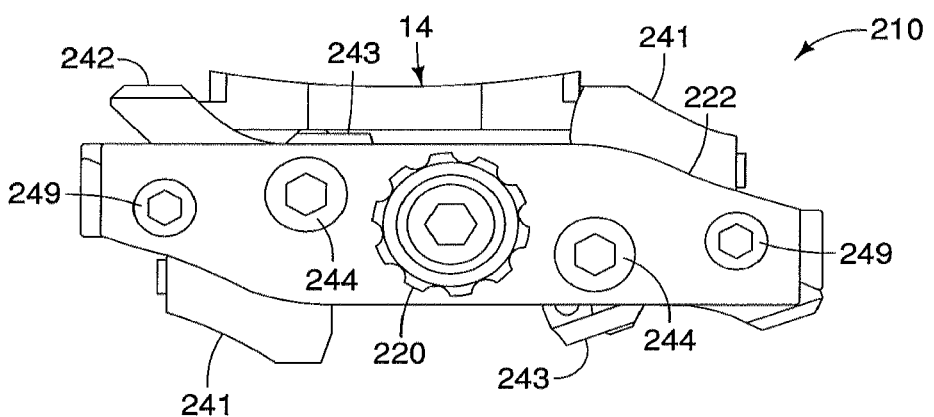
FIG. 45 is an inside elevational view, similar to FIGS. 43 and 44, of the bicycle pedal illustrated in FIGS. 35 to 44, but showing the cleat fully engaged with the cleat engagement member of the bicycle pedal.
Figure 46:
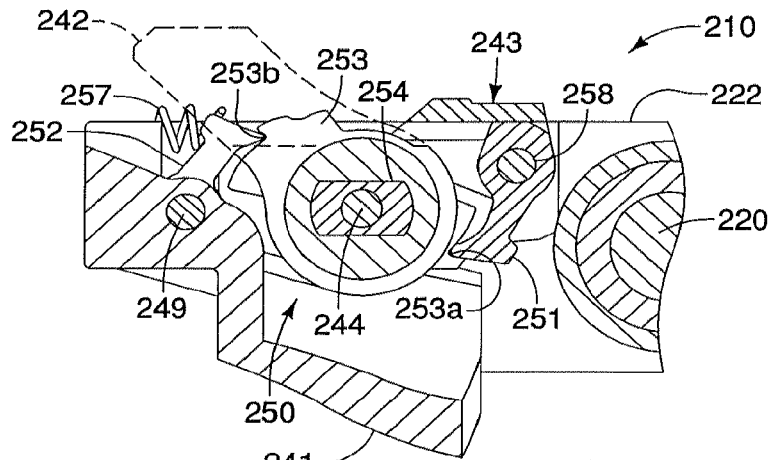
FIG. 46 is a longitudinal cross sectional view of a portion of the bicycle pedal illustrated in FIGS. 35 to 45, showing the arrangement of the pawls with respect to the ratchet member (the positioning structure) while the cleat engagement member is in the engagement position.

As seen in FIGS. 41 and 42, the pedal 210 is provided with a positioning structure 250 between the pedal body 222 and each of the cleat engagement members 242 to selectively retain the cleat engagement members 242 in their engagement positions. Here, each of the positioning structures 250 includes a first pawl or positioning element 251, a second pawl or positioning element 252 and a ratchet wheel or member 253. The first pawl 251 is movably mounted on the actuation member 243. The second pawl 252 is movably mounted on the pedal body 222. The ratchet wheel 253 is fixedly coupled to the rear cleat engagement member 242 by a fixing sleeve 254 and a clip 255 such that the rear cleat engagement member 242 and the ratchet wheel 253 move together as a unit on the pivot pin 244. If the rear cleat engagement member 242 is made of synthesis resin, then the fixing sleeve 254 is made of a metal material such as a stainless steel (SUS), and the rear cleat engagement member 242 is molded onto the fixing sleeve 254.

The first pawl 251 is pivotally mounted on the actuation member 243. The first pawl 251 is biased to engage the ratchet wheel 253 by a torsion spring 256. The first pawl 251 selectively engages a first ratchet tooth 253a of the ratchet wheel 253 to move the rear cleat engagement member 242 from its initial or release position to its engagement position in response to a rider stepping on the actuation member 243. In other words, the cleat engagement member 242 and the actuation member 243 are selectively coupled together by the first pawl 251 that is mounted on the actuation member 243. In connection between the cleat engagement member 242 and the actuation member 243 is accomplished by the first pawl 251 engaging the first ratchet tooth 253a of the ratchet wheel 253 that is fixedly coupled to the cleat engagement member 242. In this way, the cleat engagement member 242 and the actuation member 243 rotate together on the pivot pin 244 in response to the actuation member 243 being moved from the first position to the second position.

The second pawl 252 is pivotally mounted to the pedal body 222 by a pin 249. The second pawl 252 is biased to engage the ratchet wheel 253 by a compression spring 257. The second pawl 252 selectively engages a second ratchet tooth 253b of the ratchet wheel 253 to selectively retain the ratchet wheel 253 in the engagement position after the ratchet wheel 253 is rotated by the first pawl 251 in response to a rider stepping on the actuation member 243. Similar to the prior embodiments, the cleat engagement member 242 is movably mounted on the pivot pin 244 relative to the pedal body 22 to selectively disengage the second pawl 252 from the second ratchet tooth 253b of the cleat engagement member 242.

As best seen in FIGS. 42 and 49 to 51, the pedal 210 of this embodiment is further provided with a centering arrangement 270 for automatically returning the cleat engagement member 242 to a center rest position. The centering arrangement 270 basically includes a first centering arm 271, a second centering arm 272, a mounting member 273 and a centering spring 274 (i.e., a biasing element). The centering arrangement 270 is provided in a recess 275 of the pedal body 222 as seen in FIG. 42. The centering spring 274 is a compression spring that biases the first and second centering arms 271 and 272 against sidewalls defining the recess 275 of the pedal body 222. When the cleat engagement member 242 is shifted laterally on the pivot pin 244 in a first lateral direction, the first centering arm 271 is moved with the cleat engagement member 242 to compress the centering spring 274 against the second centering arm 272. Thus, when the cleat engagement member 242 is released (e.g., the cleat is disengaged from the pedal 210) the centering spring 274 expands back to its original preloaded state between the first and second centering arms 271 and 272. The expansion of the centering spring 274 moves the first centering arm 271 back against the sidewall of the recess 275. In this way, the first centering arm 271 pushes the cleat engagement member 242 back to its original centered position. Likewise, when the cleat engagement member 242 is shifted laterally on the pivot pin 244 in a second lateral direction, the second centering arm 272 is moved with the cleat engagement member 242 to compress the centering spring 274 against the first centering arm 271. Thus, when the cleat engagement member 242 is released (e.g., the cleat is disengaged from the pedal 210) the centering spring 274 expands back to its original preloaded state between the first and second centering arms 271 and 272. The expansion of the centering spring 274 moves the second centering arm 272 back against the sidewall of the recess 275. In this way, the second centering arm 272 pushes the cleat engagement member 242 back to its original centered position.

In a step-in operation, when the cleat 14 is engaged with the pedal 210, the actuation member 243 is pushed down by the shoe 12 or the cleat 14, the cleat engagement member 242 is then moved to its engagement position by the first pawl 251 engaging the first ratchet tooth 253a of the ratchet wheel 253. When the cleat engagement member 242 is disposed in its engagement position, the second pawl 252 engages the second ratchet tooth 253b of the ratchet wheel 253 to retain the ratchet wheel 253 in the engagement position after the ratchet wheel 253 is rotated by the first pawl 251. Then the cleat engagement member 242 is held at its engagement position.

Figure 47:
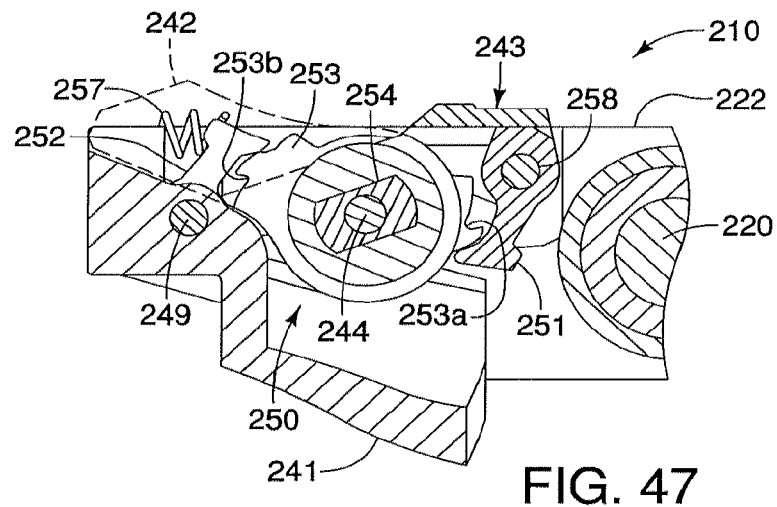
FIG. 47 is a longitudinal cross sectional view, similar to FIG. 46, of a portion of the bicycle pedal illustrated in FIGS. 35 to 45, showing the arrangement of the pawls with respect to the ratchet member (the positioning structure) after the cleat engagement member is moved laterally to release the cleat engagement member but with the actuation member still stepped on by the cleat.
Figure 50:
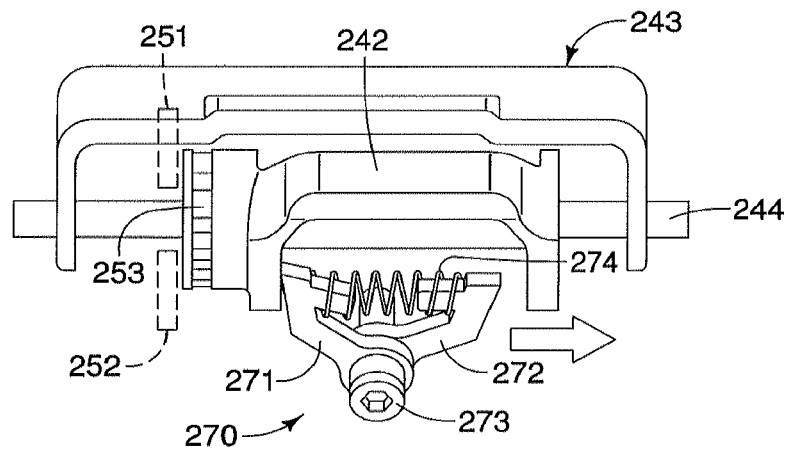
FIG. 50 is a rear perspective view, similar to FIG. 49, of selected parts of the bicycle pedal illustrated in FIGS. 36 to 45, showing the cleat engagement member shifted laterally to an outside position from the center or rest position.
Figure 51:
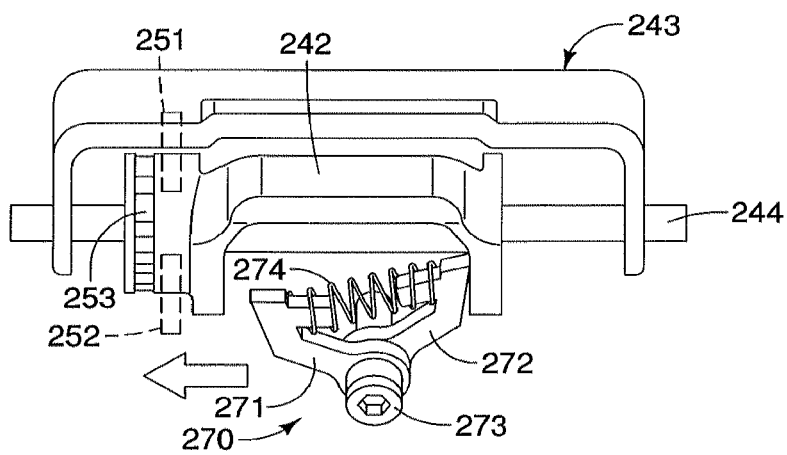
FIG. 51 is a rear perspective view, similar to FIGS. 49 and 50, of selected parts of the bicycle pedal illustrated in FIGS. 36 to 45, showing the cleat engagement member shifted laterally to an inside position from the center or rest position.

When the cleat 14 is to be disengaged from the pedal 210, the cleat engagement member 242 is moved in a lateral direction along the pivot pin 244 as illustrated in FIGS. 50 and 51. After the cleat engagement member 242 is moved in either lateral direction along the pivot pin 244 from the center position shown in FIG. 49, the first and second pawls 251 and 252 are disengaged from the ratchet wheel 253. The disengagement of the second pawl 252 from the ratchet wheel 253 then allows the cleat engagement member 242 to move to its open or release position by the return spring 246. The cleat engagement member 242 is moved back to its original centered position by the centering arrangement 270 as discussed above. Since the cleat engagement member 242 can pivot independently of the actuation member 243 on the pivot pin 244, the actuation member 243 may remain in the second (step-in) position after the cleat engagement member 242 has return to the release position if the shoe 12 or the cleat 14 is still contacting the actuation member 243 as seen in FIG. 47.

Figure 48:
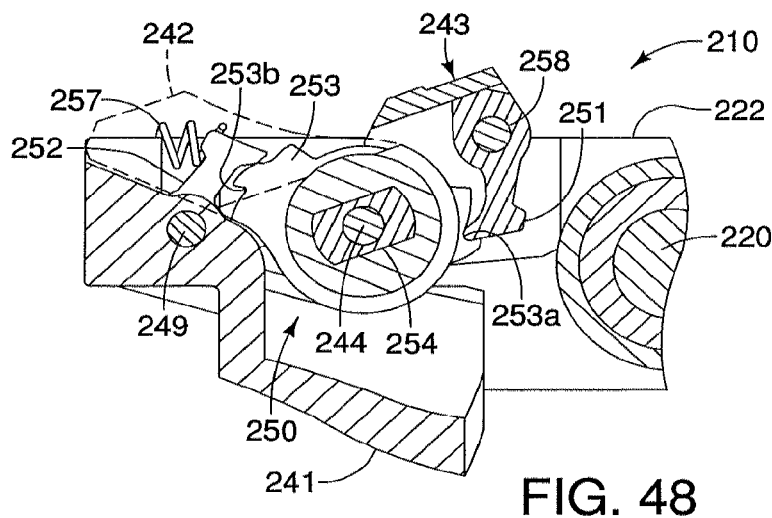
FIG. 48 is a longitudinal cross sectional view, similar to FIGS. 46 and 47, of a portion of the bicycle pedal illustrated in FIGS. 36 to 45, showing the arrangement of the pawls with respect to the ratchet member (the positioning structure) after the actuation member has been released and moved to the rest position.
Figure 49:
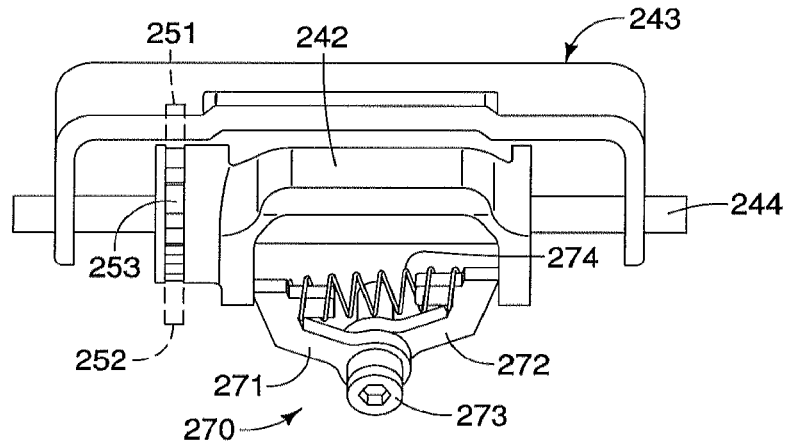
FIG. 49 is a rear perspective view of selected parts of the bicycle pedal illustrated in FIGS. 36 to 45, showing the cleat engagement member in a center or rest position.

Once the rider removes the shoe 12 or the cleat 14 from the actuation member 243, the return spring 248 will pivot the actuation member 243 back to the first (initial) position as seen in FIG. 48. In the first (initial) position, the first pawl 251 reengages the first ratchet tooth 253a of the ratchet wheel 253. Thus, if the rider steps on the actuation member 243 again, then the first pawl 251 will rotate the ratchet wheel 253. This rotation of the ratchet wheel 253 results in the cleat engagement member 242 also rotating with the ratchet wheel 253 since they are fixed together as discussed above. The second pawl 252 will then engage the second ratchet tooth 253b of the ratchet wheel 253 to retain the ratchet wheel 253 and the cleat engagement member 242 in their engagement positions.

Figure 52:
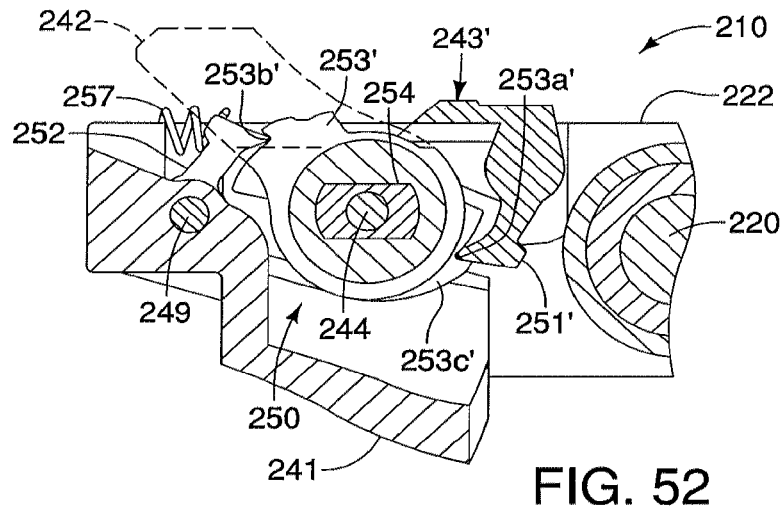
FIG. 52 is a longitudinal cross sectional view, similar to FIG. 46, of a modification for the bicycle pedal illustrated in FIGS. 35 to 45, in which the first pawl is non-pivotally coupled to the actuation member, and showing the arrangement of the pawls with respect to the ratchet member (the positioning structure) while the cleat engagement member is in the engagement position.
Figure 53:
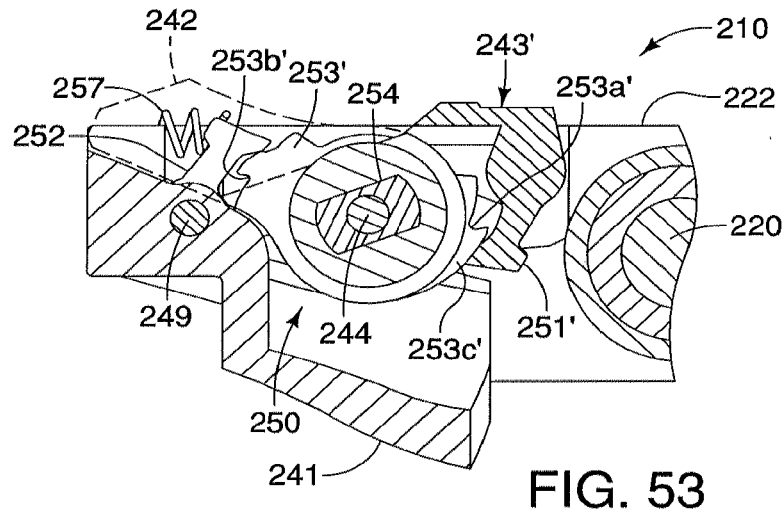
FIG. 53 is a longitudinal cross sectional view of the modified bicycle pedal illustrated in FIG. 52, but showing the arrangement of the pawls with respect to the ratchet member (the positioning structure) after the cleat engagement member is moved laterally to release the cleat engagement member but with the actuation member still stepped on by the cleat.
Figure 54:
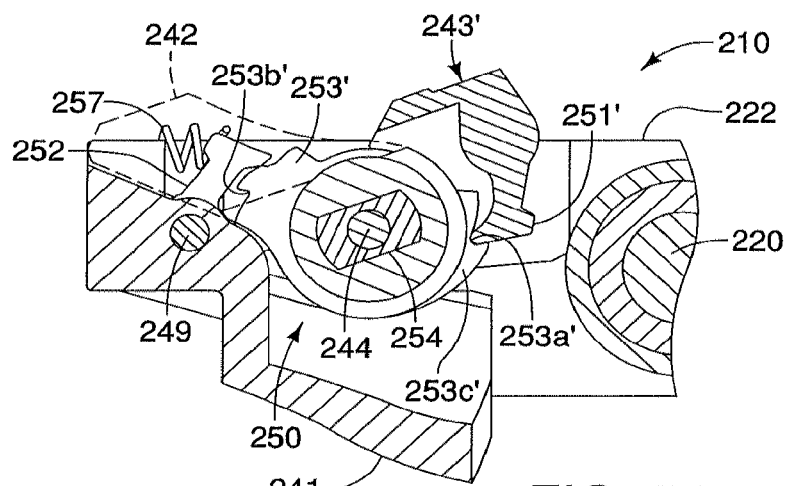
FIG. 54 is a longitudinal cross sectional view of the modified bicycle pedal illustrated in FIGS. 52 and 53, but showing the arrangement of the pawls with respect to the ratchet member (the positioning structure) after the actuation member has been released and moved to the rest position.
Figure 55:
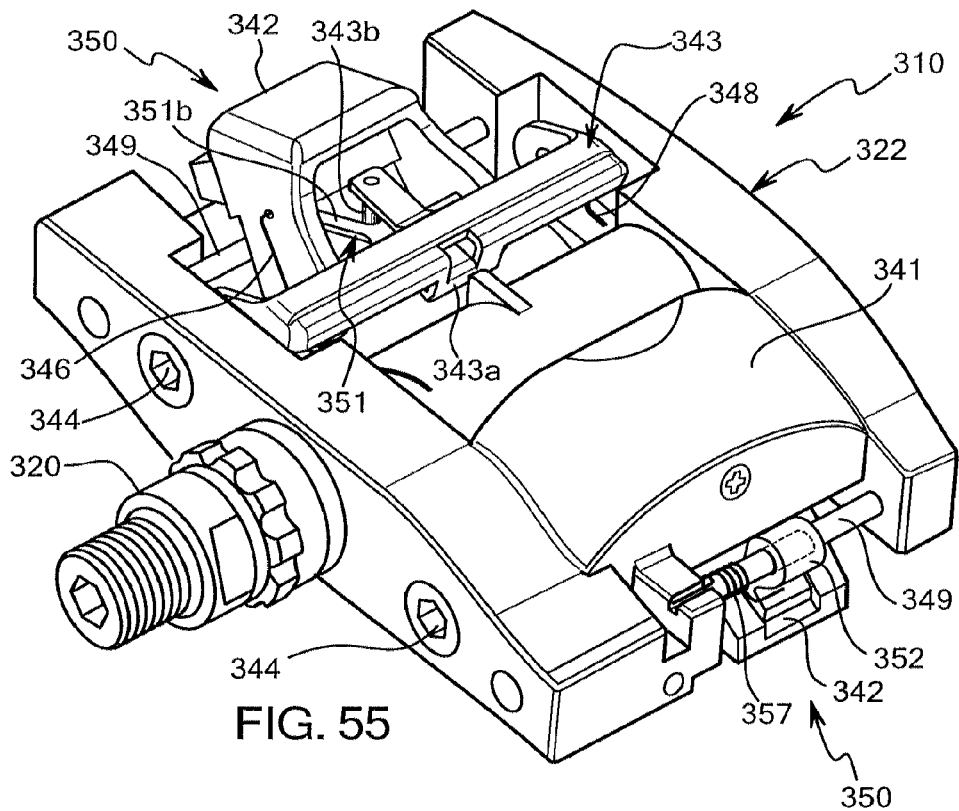
FIG. 55 is a top perspective view of a bicycle pedal in accordance with a fourth illustrated embodiment.
Figure 56:
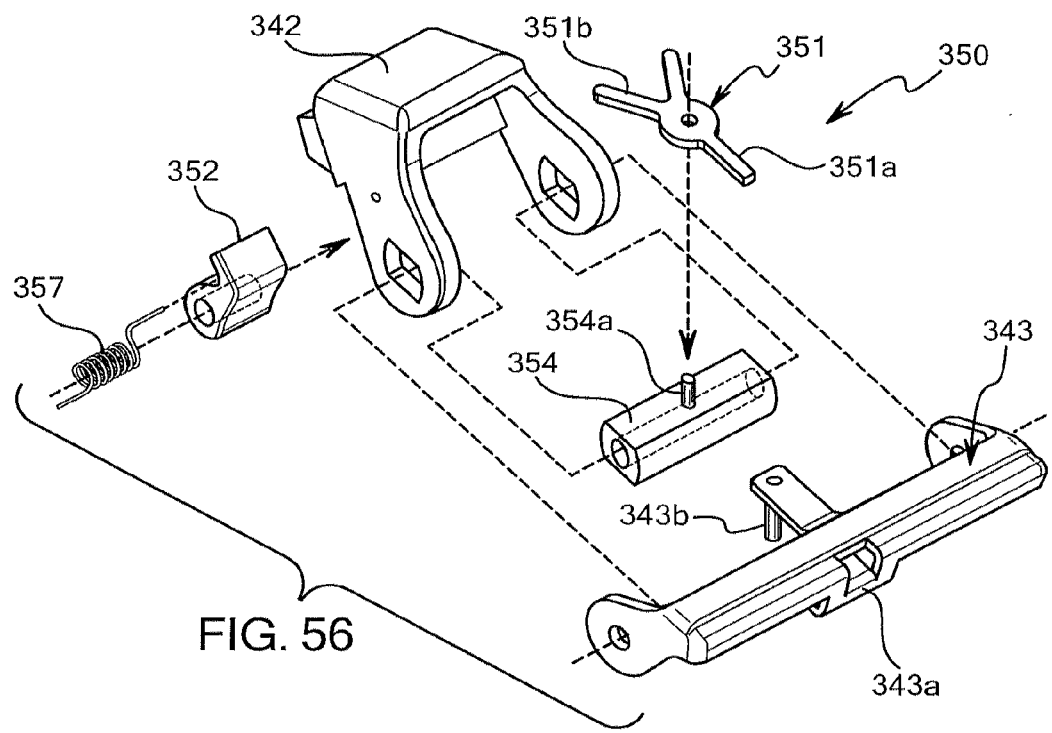
FIG. 56 is a perspective view of selected parts of the bicycle pedal illustrated in FIG. 55.

Referring now to FIGS. 52 to 54, the pedal 210 illustrated in FIGS. 35 to 51 has been modified to include an alternate actuation member 243', an alternate first pawl 251' and an alternate ratchet wheel 253' in place of the actuation member 243, the first pawl 251 and the ratchet wheel 253. In other words, only the alternate actuation member 243', the alternate first pawl 251' and the alternate ratchet wheel 253' are different from the rest of the pedal 210 illustrated in FIGS. 35 to 51. Thus, the parts that remain unchanged in FIGS. 52 to 54 will not be discussed again with respect to the alternate actuation member 243', the alternate first pawl 251' and the alternate ratchet wheel 253'.

Basically, by using the alternate actuation member 243', the alternate first pawl 251' and the alternate ratchet wheel 253', the bicycle pedal 210 is simplified (e.g., less parts). In particular, the alternate actuation member 243' and the alternate first pawl 251' have integrated together. In FIGS. 52 to 54, the alternate actuation member 243' and the alternate first pawl 251' are illustrated as a one-piece, unitary member. Alternatively, the alternate first pawl 251' can be fixed to the alternate actuation member 243' by a fastener (e.g., rivets, screws, adhesive, etc.).

As seen in FIG. 52, since the alternate first pawl 251' is not pivotally coupled to the alternate actuation member 243', the alternate ratchet wheel 253' is slightly different from the ratchet wheel 253 discussed above. In particular, the alternate ratchet wheel 253' has a first ratchet tooth 253a' that selectively engages the first pawl 251' and a second ratchet tooth 253b' that selectively engages the second pawl 252 in a similar manner to the ratchet wheel 253 discussed above. However, the alternate ratchet wheel 253' includes an enlarged portion 253c' adjacent the first ratchet tooth 253a' that is not present in the ratchet wheel 253.

As seen in FIG. 53, the enlarged portion 253c' is dimensioned to contact the first pawl 251' for preventing the rear cleat engagement member 242 from moving back to its initial or center position while the alternate actuation member 243' is held in its second (step-in) position. In particular, while the alternate actuation member 243' is held in its second (step-in) position and the rear cleat engagement member 242 has returned to the release position, the first pawl 251' contacts one of the side faces of the ratchet wheel 253' depending on the lateral direction that the rear cleat engagement member 242 was move to release the cleat 14. When the actuation member 243' moves back to first (initial) position, the rear cleat engagement member 242 moves laterally back to initial or center position by the biasing force of the centering spring 274. Once the rear cleat engagement member 242 moves laterally back to initial or center position, the first pawl 251' engages the first ratchet tooth 253a' as seen in FIG. 54.

Referring now to FIGS. 55 to 67, a bicycle pedal 310 is illustrated in accordance with a fourth illustrated embodiment. Basically, the bicycle pedal 310 is used with the bicycle shoe 12 and the cleat 14. The bicycle pedal 310 operates in the same manner as the bicycle pedals 10, 110 and 210 in that the cleat 14 is engaged with the pedal 310 with a relatively low engagement force and disengaged from the pedal 310 with a relatively low disengagement force. However, the structure of the pedal 310 is different from the prior embodiments to accomplish the retaining and the releasing of the cleat 14.

The bicycle pedal 310 includes a pedal spindle or axle 320 and a pedal body 322. The pedal spindle 320 and the pedal body 322 are constructed and function in substantially the same manner as the pedal spindle 20 and the pedal body 22. Thus, the descriptions of the pedal spindle 20 and the pedal body 22 applies to the pedal spindle 320 and the pedal body 322, respectively. The pedal body 222 includes two front cleat engagement members 341 and two rear cleat engagement members 342. The front cleat engagement members 341 are fixedly coupled to the pedal body 322 for engaging a front end of the cleat 14. The rear cleat engagement members 342 are movably coupled to the pedal body 322 for engaging a rear end of the cleat 14.

Each of the rear cleat engagement members 342 has an associated actuation member 343 that moves the associated one of the rear cleat engagement members 342 from a release position to an engagement position in response to a rider stepping on the actuation member 343. Each pair of the cleat engagement members 342 and the associated actuation members 343 are pivotally mounted relative to the pedal body 322 about a single pivot axis. In particular, the rear cleat engagement members 342 and the actuation members 343 are pivotally mounted to the pedal body 322 by a pair of pivot pins 344. Springs 346 are provided to bias the rear cleat engagement members 342 to their release positions. Springs 348 are provided to bias the actuation members 343 to their initial step-in ready positions.

The pedal 310 is also provided with a positioning structure 350 between the pedal body 322 and each of the cleat engagement members 342 to selectively retain the cleat engagement members 342 in their engagement positions. Here, each of the positioning structures 350 includes a first positioning element or release member 351 and a second positioning element or holding member 352. The positioning element or release member 351 selectively couples the actuation member 343 to the cleat engagement member 342. The first positioning element or release member 351 is mounted on a sleeve member 354 that is fixedly coupled to the cleat engagement members 342. Thus, the release member 351 and the cleat engagement members 342 move together as a unit on the pivot pin 344. The second positioning element or holding member 352 is movably mounted on the pedal body 322 by a pin 349. The holding member 352 is biased by a torsion spring 357 towards a retaining position. In the retaining position, the holding member 352 retains the cleat engagement member 342 in the engagement position while the cleat engagement member 342 is in the engagement position. When the cleat engagement member 342 is in the release position, the cleat engagement member 342 maintains the holding member 352 in a non-retaining position due to the biasing force of the spring 346.

The actuation member 343 includes a first engagement portion 343a and a second engagement portion 343b. The first engagement portion 343a is configured and arranged to selectively engage the release member 351 so that the release member 351 moves with the actuation member 343 while the release member 351 is engaged with the first engagement portion 343a of the actuation member 343. When the release member 351 is disengaged from the first engagement portion 343a of the actuation member 343, the release member 351 moves independently of the actuation member 343 about the axis of the pivot pin 344. The second engagement portion 343b is configured and arranged to selectively engage the release member 351 to move the release member 351 relative to the actuation member 343. Movement of the release member 351 by the second engagement portion 343b causes the release member 351 to move between a first or rest position and a second or disengaging position. In the first or rest position, the release member 351 is engaged with the first engagement portion 343a of the actuation member 343 so that the release member 351 moves with the actuation member 343. In the second or disengaging position, the release member 351 is disengaged from the first engagement portion 343a of the actuation member 343 so that the release member 351 moves independently of the actuation member 343.

The release member 351 is movably arranged to disengage the holding member 352 and the actuation member 343 from the cleat engagement member 342 in response to lateral movement of the cleat engagement member relative to the pedal body 322. In particular, the release member 351 is pivotally mounted on a pivot pin 354a of the sleeve 354. The pivot pin 354a of the sleeve 354 is disposed in a hole of the release member 351, which is located between the first contact portion 351a and the second contact portions 351b. The free end of the pivot pin 354a is deformed to pivotally retain the release member 351 on the sleeve 354. Since the release member 351 is attached to the sleeve 354, the release member 351 pivots with the cleat engagement member 342 on the pivot pin 344. In other words, the release member 351 is mounted on the cleat engagement member 342 to move together about the single pivot axis of the pivot pin 344. The pivot axis direction of the pivot pin 354a is perpendicular to the pivot axis direction of the pivot pin 344.

In this embodiment, the release member 351 is a Y shaped member that includes a first contact portion 351a and a pair of second contact portions 351b. The first contact portion 351a engages the first engagement portion 343a of the actuation member 343 so that the release member 351 moves with the actuation member 343 while the release member 351 is in its first or rest position. The second contact portions 351b selectively contact the second engagement portion 343b of the actuation member 343 when the cleat engagement member 342 is shifted laterally on the pivot pin 344 so that the first contact portion 351a disengages from the first engagement portion 343a of the actuation member 343 while the release member 351 is in its second or disengaging position.

Figure 57:
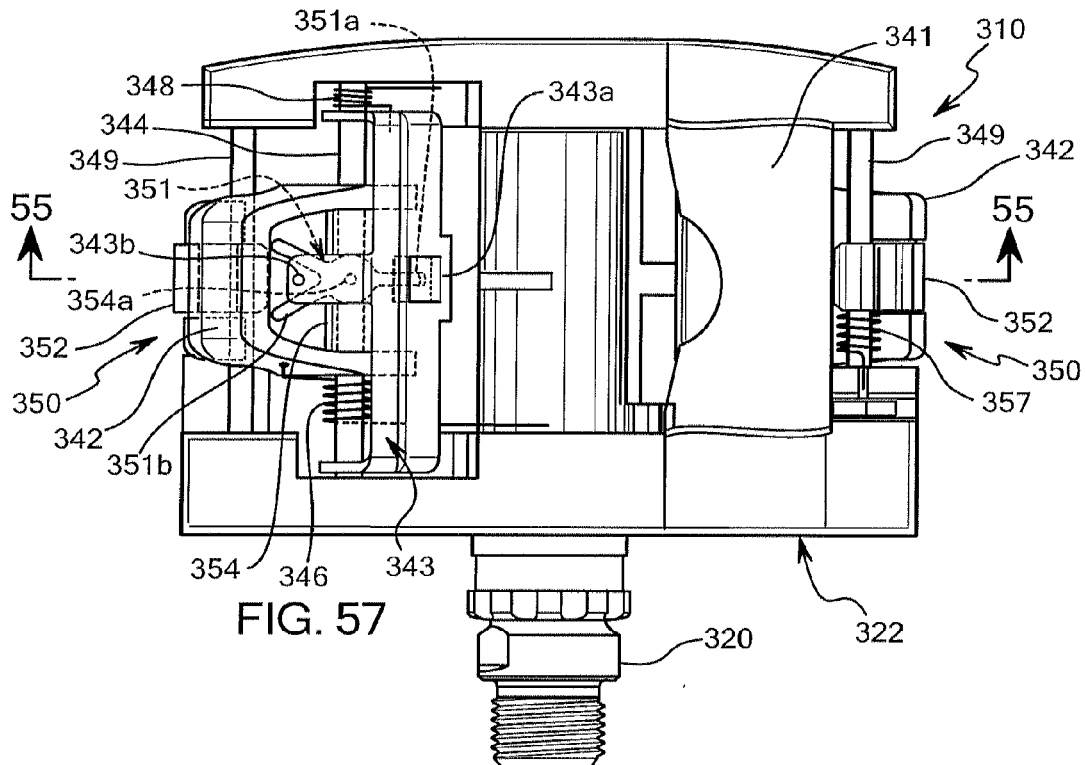
FIG. 57 is a top plan view of the bicycle pedal illustrated in FIGS. 55 and 56, showing the cleat engagement member in the engagement position.
Figure 58:
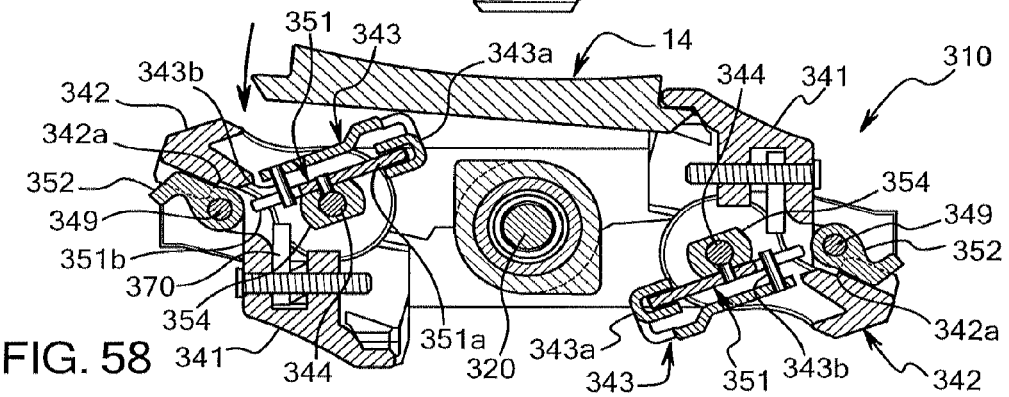
FIG. 58 is a longitudinal cross sectional view of the bicycle pedal illustrated in FIGS. 55 to 57, showing the arrangement of the positioning structure while the cleat engagement member is in the release position.
Figure 59:
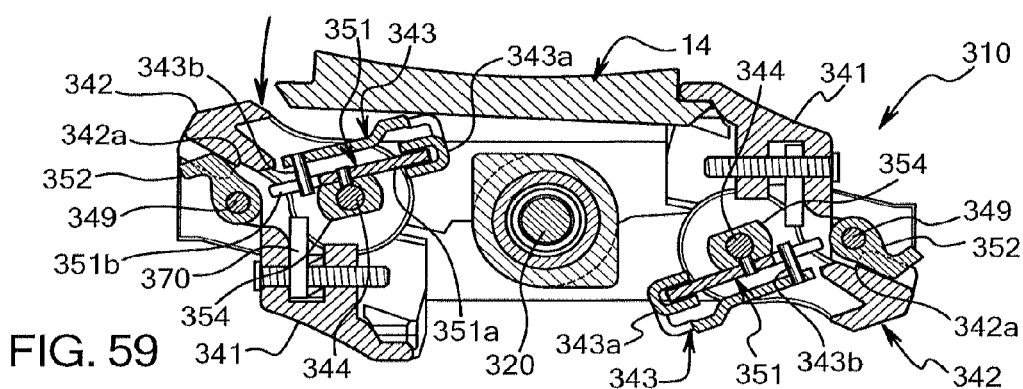
FIG. 59 is a longitudinal cross sectional view of the bicycle pedal illustrated in FIGS. 55 to 58, showing the arrangement of the positioning structure while the cleat engagement member is in between the release position and the engagement position.

As seen in FIG. 57, the first contact portion 351a of the release member 351 extends in a forward direction relative to the pivot pin 354a, while the second contact portions 351b extend in a rearward direction relative to the pivot pin 354a. With the release member 351 in its initial or rest position, the first contact portion 351a of the release member 351 is longitudinally aligned with the second engagement portion 343b of the actuation member 343. Thus, the first contact portion 351a in its initial or rest position is aligned with the first engagement portion 343a of the actuation member 343 so that the cleat engagement member 342 and the release member 351 pivot together on the pivot pin 344. Also with the release member 351 in its initial or rest position, the first contact portion 351a of the release member 351 is longitudinally aligned with the pivot pin 354a, the second engagement portion 343b and the holding member 352.

The second contact portions 351b of the release member 351 are arranged to form an angle below ninety degree so as to closely straddle the holding member 352. Also the second engagement portion 343b is located between the second contact portions 351b. In other words, at least a part of the holding member 352 and the second engagement portion 343b are located between the second contact portions 351b so that rotation of the release member 351 in either direction causes one of the second contact portions 351b to contact the holding member 352. Once one of the second contact portions 351b contacts the holding member 352, any further rotation of the release member 351 in the same rotational direction about the pivot pin 354a causes the second contact portions 351b to push the holding member 352 rearward against the biasing force of the spring 357. Rearward movement of the holding member 352 releases the cleat engagement member 342 to pivot the pivot pin 344 rearward under the biasing force of the return spring 346.

Figure 64:
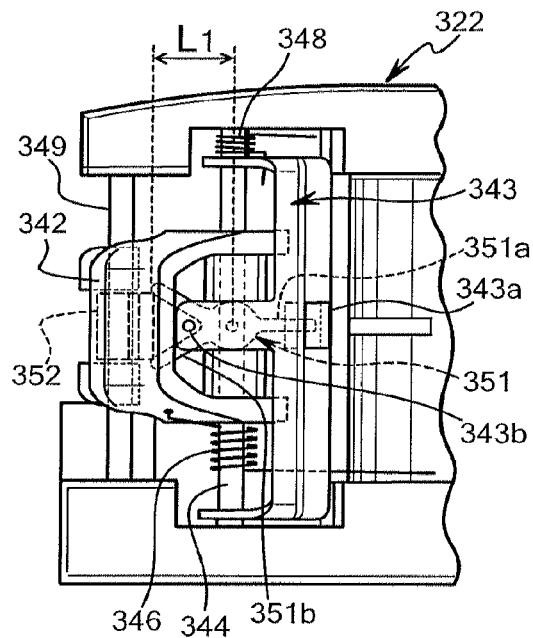
FIG. 64 is a partial top plan view of a portion of the bicycle pedal illustrated in FIGS. 55 to 62, showing the arrangement of the positioning structure while the cleat engagement member is in the engagement position.
Figure 65:
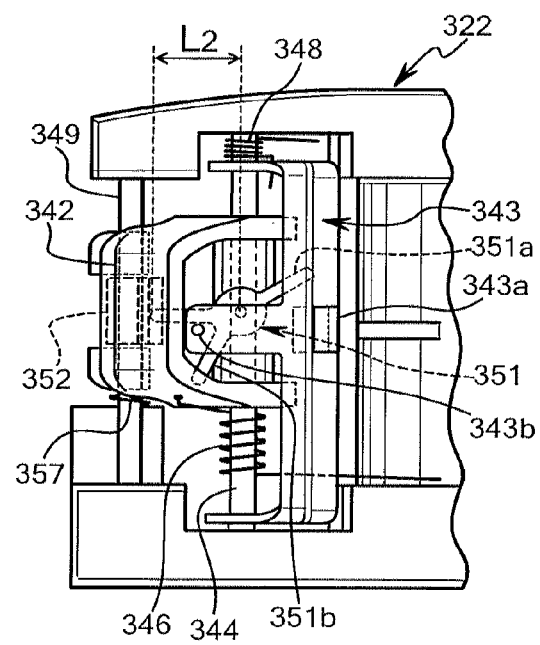
FIG. 65 is a partial top plan view of a portion of the bicycle pedal illustrated in FIGS. 55 to 62, showing the arrangement of the positioning structure after the cleat engagement member is moved laterally in a first lateral direction while in the engagement position and the actuation member is held down by the cleat.
Figure 66:
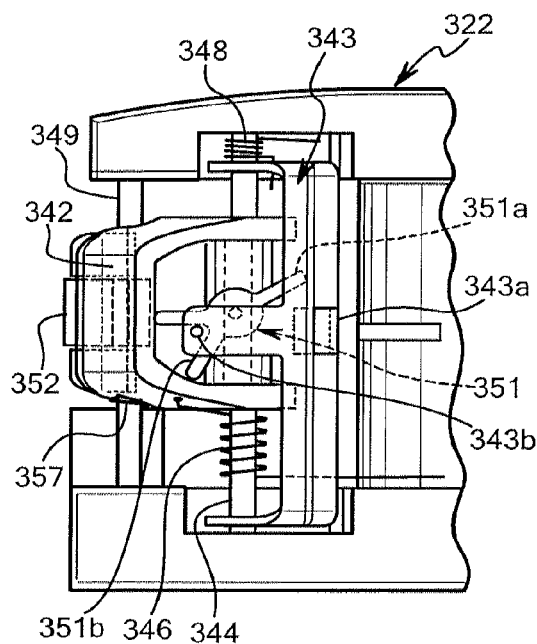
FIG. 66 is a partial top plan view of a portion of the bicycle pedal illustrated in FIGS. 55 to 62, showing the arrangement of the positioning structure after the cleat engagement member is moved laterally in the first lateral direction and moved to a release position, but prior to the actuation member being released from the cleat.
Figure 67:
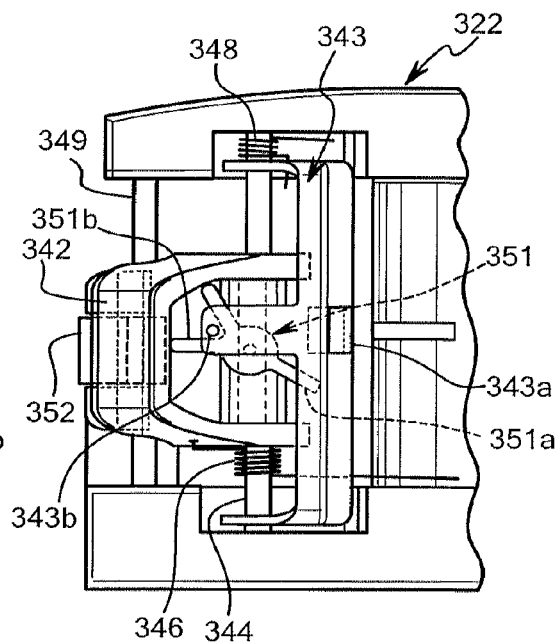
FIG. 67 is a partial top plan view, similar to FIG. 66, of a portion of the bicycle pedal illustrated in FIGS. 55 to 62, but showing the arrangement of the positioning structure after the cleat engagement member is moved laterally in a second lateral direction and moved to a release position, but prior to the actuation member being released from the cleat.

Alternatively, the holding member 352 does not have to be located directly between the second contact portions 351b, because when the release member 351 is rotated the tip of one of the second contact portions 351b moves in a rearward direction from its initial position as seen in FIGS. 64 and 65. In particular, the second contact portions 351b have a first effective length L1 as measured from the axis of the pivot pin 354a while the release member 351 is in its initial or rest position. However, upon rotation of the release member 351 on the pivot pin 354a to a release position, one of the second contact portions 351b will now have a second effective length L2 that is longer than the length L1. In this way, the second contact portions 351b push the holding member 352 rearward against the biasing force of the spring 357 to release the cleat engagement member 342. Thus, depending on the positions and dimensions of the release member 351 and the holding member 352, the holding member 352 does not have to be located directly between the second contact portions 351b.

The pedal 310 of this embodiment is further provided with a centering arrangement 370 for maintaining the cleat engagement member 342 in its center position. The centering arrangement 370 is identical to the centering arrangement of the centering arrangement 270 as discussed above. Thus, the centering arrangement 370 of the pedal 310 will not be discussed or illustrated with respect to the pedal 310.

In a step-in operation, when the cleat 14 is engaged with the pedal 310, the actuation member 343 is pushed down by the shoe 12 or the cleat 14, the cleat engagement member 342 is then moved to its engagement position by the first contact portion 351a of the release member 351 engaging the first engagement portion 343a of the actuation member 343. When the actuation member 343 is stepped on by the cleat 14, the cleat engagement member 342 and the release member 351 are rotated around the pivot axis of the pivot pin 344. Since the holding member 352 is biased against the cleat engagement member 342, when the cleat engagement member 342 is in the engagement position, the holding member 352 engages a recess 342a of the cleat engagement member 342. The holding member 352 prevents the cleat engagement member 342 from returning to its release position.

When the cleat 14 is twisted relative to the pedal body 322, the cleat engagement member 342 moves laterally on the pivot pin 344 to inside or outside the pedal body 322. However, the actuation member 243 is not moved by this lateral movement of the cleat engagement member 342. This lateral movement of the cleat engagement member 342 causes the release member 351 to shift laterally with the cleat engagement member 342. When the cleat engagement member 342 moves laterally to inside or outside of the pedal body 322, the release member 351 also moves laterally to inside or outside of the pedal body 322. This lateral movement of the release member 351 results in the release member 351 rotating on the pivot pin 354a of the sleeve 354 as the sleeve 354 moves laterally with the cleat engagement member 342. In particular, one of the second contact portions 351b of the release member 351 contacts the second engagement portion 343b and the release member 351 is pivoted. This rotational movement of the release member 351 on the pivot pin 354a of the sleeve 354 results in the first contact portion 351a of the release member 351 being rotated out of engagement with the first engagement portion 343a of the cleat engagement member 342. This rotational movement of the release member 351 and this disengagement of the first contact portion 351a from the first engagement portion 343a occur because the first engagement portion 343a of the actuation member 343 does not move during the lateral movement of the cleat engagement member 342. In other the first contact portion 351a disengages from the first engagement portion 343a of the actuation member 343 by this lateral movement of the release member 351. The lateral movement of the release member 351 also causes the second contact portions 351b to move the holding member 352 out of the recess 342a of the cleat engagement member 342. The cleat engagement member 342 then moves the holding member 352 to its non-retaining position as the cleat engagement member 342 moves to its release position due to the biasing force of the spring 346.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the bicycle pedal. Accordingly, these terms, as utilized to describe the present invention should be interpreted relative to a bicycle equipped with the bicycle pedal as used in the normal riding position on flat ground. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle pedal comprising:
a pedal spindle;
a pedal body rotatably mounted on the pedal spindle;
a cleat engagement member movably mounted relative to the pedal body about a pivot axis between a release position and an engagement position, the cleat engagement member being biased towards the release position while in the engagement position and while in the release position;
an actuation member mechanically connected to the cleat engagement member, the actuation member being movably mounted relative to the pedal body from a first position to a second position such that the actuation member moves the cleat engagement member from the release position to the engagement position, the actuation member being rotatably coupled relative to the pedal body; and
a positioning structure configured to selectively retain the cleat engagement member in the engagement position, the positioning structure being mounted on the pivot axis, the pivot axis passing through a portion of the cleat engagement member and a portion of the positioning structure.

2. The bicycle pedal according to claim 1, wherein the positioning structure is configured to selectively release the cleat engagement member from the engagement position.

3. The bicycle pedal according to claim 1, wherein the positioning structure includes a first clutch mechanism.

4. The bicycle pedal according to claim 1, wherein the actuation member drives the cleat engagement member so that the positioning structure retains the cleat engagement member in the engagement position.

5. The bicycle pedal according to claim 1, wherein the cleat engagement member and the actuation member are separate members.

6. The bicycle pedal according to claim 5, wherein the cleat engagement member and the actuation member are coupled by a clutch mechanism.

7. The bicycle pedal according to claim 5, wherein the cleat engagement member is biased toward the release position by a first biasing member; and
the actuation member is biased toward the first position by a second biasing member.

8. The bicycle pedal according to claim 1, wherein the cleat engagement member and the actuation member are one-piece.

9. The bicycle pedal according to claim 1, wherein the actuation member is biased toward the first position.

10. The bicycle pedal according to claim 1, wherein the cleat engagement member is pivotally mounted to the pedal body by a pivot pin with the actuation member rotatably mounted on the pivot pin.

11. The bicycle pedal according to claim 1, further comprising
an additional actuation member that is mechanically connected to an additional cleat engagement member, and the additional actuation member being movably mounted relative to the pedal body from a first position to a second position.

12. The bicycle pedal according to claim 11, wherein the cleat engagement member constituting a first cleat engagement member with a first cleat contact surface that is located on a first cleat engagement side of a reference plane that passes through a center spindle axis of the pedal spindle, and the additional cleat engagement member constituting a second cleat engagement member with a second cleat contact surface that is located on second cleat engagement side of the reference plane, the first cleat contact surface facing the pedal body to at least partially define a first cleat retaining area located on the first cleat engagement side of the reference plane, and the second cleat contact surface facing the pedal body to at least partially define a second cleat retaining area located on the second cleat engagement side of the reference plane.

13. The bicycle pedal according to claim 11, wherein the cleat engagement member constituting a first cleat engagement member with a first cleat contact surface that is located on a first cleat engagement side of a reference plane that passes through a center spindle axis of the pedal spindle, the additional cleat engagement member constituting a second cleat engagement member with a second cleat contact surface that is located on the first cleat engagement side, and the first and second cleat contact surfaces facing the pedal body to define a cleat retaining area located on the first cleat engagement side of the reference plane.

14. The bicycle pedal according to claim 1, further comprising
an additional cleat engagement member that is rigidly fixed to the pedal body, the cleat engagement member constituting a first cleat engagement member with a first cleat contact surface, the additional cleat engagement member constituting a second cleat engagement member with a second cleat contact surface, and the first and second cleat contact surfaces facing the pedal body to define a cleat retaining area lying on one side of a reference plane that passes through a center spindle axis of the pedal spindle.

15. The bicycle pedal according to claim 1, wherein the cleat engagement member and the actuation member are selectively coupled together by a first pawl on the actuation member that engages a first ratchet tooth coupled to the cleat engagement member in response to the actuation member being moved from the first position to the second position.

16. The bicycle pedal according to claim 15, wherein the positioning structure includes a second pawl that engages a second ratchet tooth coupled to the cleat engagement member to selectively retain the cleat engagement member in the engagement position.

17. The bicycle pedal according to claim 16, wherein the cleat engagement member is movably mounted relative to the pedal body to selectively disengage the second pawl from the second ratchet tooth.

18. The bicycle pedal according to claim 16, wherein the first ratchet tooth and the second ratchet tooth are disposed on a ratchet member that is fixed to the cleat engagement member.

19. The bicycle pedal according to claim 16, wherein the actuation member is pivotally mounted relative to the pedal body about the pivot axis, the first pawl is movably mounted on the actuation member, and the second pawl is movably mounted on the pedal body.

20. The bicycle pedal according to claim 16, wherein the actuation member is mounted relative to the pedal body about the pivot axis, the first pawl is non-movably coupled to the actuation member, and the second pawl is movably mounted on the pedal body.

21. The bicycle pedal according to claim 1, wherein the positioning structure includes a holding member that is biased to towards a position that retains the cleat engagement member in the engagement position while the cleat engagement member is in the engagement position.

22. The bicycle pedal according to claim 21, wherein the actuation member is pivotally mounted relative to the pedal body about the pivot axis.

23. The bicycle pedal according to claim 21, wherein the cleat engagement member is biased toward the release position, and the cleat engagement member maintains the holding member in a non-retaining position.

24. The bicycle pedal according to claim 21, wherein the positioning structure includes a release member that selectively couples the actuation member to the cleat engagement member, the release member being movably arranged to disengage the holding member and the actuation member from the cleat engagement member in response to lateral movement of the cleat engagement member relative to the pedal body.

25. The bicycle pedal according to claim 21, wherein the actuation member is pivotally mounted relative to the pedal body about the pivot axis, and the release member is mounted on the cleat engagement member to move together about the pivot axis.

26. A bicycle pedal comprising:
a pedal spindle;
a pedal body rotatably mounted on the pedal spindle;
a cleat engagement member movably mounted relative to the pedal body between a release position and an engagement position, the cleat engagement member being biased towards the release position;
an actuation member mechanically connected to the cleat engagement member, the actuation member being movably mounted relative to the pedal body from a first position to a second position such that the actuation member moves the cleat engagement member from the release position to the engagement position; and
a positioning structure that is configured to selectively retain the cleat engagement member in the engagement position, the cleat engagement member being pivotally mounted relative to the pedal body about a pivot axis, and movably mounted relative to the pedal body in an axial direction along the pivot axis such that movement of the cleat engagement member in the axial direction of the pivot axis disengages the positioning structure.

27. The bicycle pedal according to claim 26, wherein the cleat engagement member is biased toward the release position by a biasing member arranged between the pedal body and the cleat engagement member.

28. A bicycle pedal comprising:
a pedal spindle;
a pedal body rotatably mounted on the pedal spindle;
a cleat engagement member movably mounted relative to the pedal body about a pivot axis between a release position and an engagement position, the cleat engagement member being biased towards the release position while in the engagement position and while in the release position;
an actuation member mechanically connected to the cleat engagement member, the actuation member being movably mounted relative to the pedal body from a first position to a second position such that the actuation member moves the cleat engagement member from the release position to the engagement position, the actuation member being rotatably coupled relative to the pedal body, and being connected to the cleat engagement member by a one-way clutch such that the actuation member and the cleat engagement member move together as the actuation member moves from the first position to the second position; and
a positioning structure configured to selectively retain the cleat engagement member in the engagement position, the positioning structure being mounted on the pivot axis, the pivot axis passing through a portion of the cleat engagement member and a portion of the positioning structure.

29. A bicycle pedal comprising:
a pedal spindle;
a pedal body rotatably mounted on the pedal spindle;
a cleat engagement member movably mounted relative to the pedal body between a release position and an engagement position, the cleat engagement member being biased towards the release position;
an actuation member mechanically connected to the cleat engagement member, the actuation member being movably mounted relative to the pedal body from a first position to a second position such that the actuation member moves the cleat engagement member from the release position to the engagement position; and
a positioning structure that is configured to selectively retain the cleat engagement member in the engagement position, the cleat engagement member being movably arranged to selectively move in first and second lateral directions relative to the pedal body from an initial position, the first and second lateral directions being opposite directions, the cleat engagement member disengaging the positioning structure from the cleat engagement member in response to movement of the cleat engagement member from the initial position in the first lateral direction, and the cleat engagement member disengaging the positioning structure from the cleat engagement member in response to movement of the cleat engagement member from the initial position in the second lateral direction.

30. A bicycle pedal comprising:
a pedal spindle;
a pedal body rotatably mounted on the pedal spindle;
a cleat engagement member movably mounted relative to the pedal body on a pivot axis between a release position and an engagement position, the cleat engagement member being biased towards the release position while in the engagement position and while in the release position;
an actuation member mechanically connected to the cleat engagement member, the actuation member being movably mounted relative to the pedal body from a first position to a second position such that the actuation member moves the cleat engagement member from the release position to the engagement position, the actuation member being rotatably coupled relative to the pedal body; and
a positioning structure configured to selectively retain the cleat engagement member in the engagement position, the positioning structure being mounted on an axis, the axis of the positioning structure and the pivot axis of the cleat engagement member being coaxial.

* * * * *